US009374412B2

(12) United States Patent
Yoshimura

(10) Patent No.: US 9,374,412 B2
(45) Date of Patent: Jun. 21, 2016

(54) INFORMATION PROCESSING APPARATUS, INFORMATION ACQUIRING METHOD, AND COMPUTER READABLE RECORDING MEDIUM IN WHICH INFORMATION ACQUISITION PROGRAM IS STORED

(71) Applicant: FUJITSU LIMITED, Kawasaki-shi, Kanagawa (JP)

(72) Inventor: Katsuyoshi Yoshimura, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 414 days.

(21) Appl. No.: 13/966,777

(22) Filed: Aug. 14, 2013

(65) Prior Publication Data

US 2013/0332582 A1 Dec. 12, 2013

Related U.S. Application Data

(63) Continuation of application No. PCT/JP2011/054104, filed on Feb. 24, 2011.

(51) Int. Cl.

*G06F 15/16* (2006.01)
*H04L 29/08* (2006.01)
*G06F 9/50* (2006.01)

(52) U.S. Cl.

CPC .............. *H04L 67/02* (2013.01); *G06F 9/5027* (2013.01); *G06F 2209/5017* (2013.01)

(58) Field of Classification Search

CPC ............................ H04L 29/0809; H04L 67/02
See application file for complete search history.

(56) References Cited

U.S. PATENT DOCUMENTS

| | | | | |
|---|---|---|---|---|
| 7,653,689 | B1 * | 1/2010 | Champagne ....... | H04N 21/2402 709/203 |
| 2002/0143627 | A1 * | 10/2002 | Barsade ............ | G06Q 30/0262 705/14.59 |
| 2006/0010470 | A1 | 1/2006 | Kurosaki et al. | |
| 2006/0195466 | A1 | 8/2006 | Yoshimura et al. | |
| 2011/0066676 | A1 * | 3/2011 | Kleyzit ............ | G06F 17/30902 709/203 |
| 2014/0282394 | A1 * | 9/2014 | Karimisetty .............. | G06F 8/30 717/120 |

FOREIGN PATENT DOCUMENTS

| | | |
|---|---|---|
| JP | 2001-306434 | 11/2001 |
| JP | 2004-128795 A | 4/2004 |
| JP | 2006-243789 | 9/2006 |
| JP | 2010-198055 | 9/2010 |

OTHER PUBLICATIONS

Japanese Office Action mailed Sep. 9, 2014 for corresponding Japanese Patent Application No. 2013-500780, with Partial English Translation, 3 pages.
International Search Report, mailed in connection with PCT/JP2011/054104 and mailed Apr. 5, 2011.

* cited by examiner

*Primary Examiner* — Brendan Higa
(74) *Attorney, Agent, or Firm* — Fujitsu Patent Center

(57) ABSTRACT

In an information generating device, a plurality of division information acquisition requests obtained by dividing an information acquisition request are transmitted through a web server, division response information corresponding to the division information acquisition requests is acquired from the information generating device through the web server, output information is generated using the acquired division response information, and thus it is possible to relieve concentration of load in the web server and to reliably perform screen display in the web browser.

9 Claims, 25 Drawing Sheets

FIG. 2

| Interface Name | Status | MAC Address | Type | Speed | IP Address | Subnet Mask |
|---|---|---|---|---|---|---|
| eth0 | Up | 00:0B:5D:xx:xx:xx | Ether | 100Mbps | 192.168.x.x | 255.255.255.0 |
| eth1 | Down | 00:0B:5D:xx:xx:xx | Ether | 100Mbps | - | - |
| eth2 | Up | 00:0B:5D:xx:xx:xx | Ether | 100Mbps | 192.168.x.x | 255.255.255.0 |
| eth3 | Up | 00:0B:5D:xx:xx:xx | Ether | 100Mbps | 192.168.x.x | 255.255.255.0 |
| eth4 | Down | 00:0B:5D:xx:xx:xx | Ether | 10Mbps | - | - |

FIG. 5

```
//DEFINE IDENTIFIER (IFOID) OF ACQUISITION ITEM AS ARRANGEMENT ITEM_OID
document.ITEM_OID = new Array(1,2,3,4,5,6,7);

// CALCULATE INITIAL VALUE OF PROGRESS (100/NUMBER OF ACQUISITION ITEMS)
var f_percent = 100/document.ITEM_OID.length;

// SET INITIAL VALUE OF PROGRESS (INTEGER VALUE OBTAINED BY ROUNDING OFF DECIMAL PLACES)
document.percent=Math.ceil(f_percent);

// CALL progress.html TO DIVISION INFORMATION REQUEST FRAME (statusFrame)
// DESIGNATE IFOID (IDENTIFIER OF ACQUISITION ITEM),
  ITEM_OID_NO (ITEM_OID ARRANGEMENT NUMBER FOR DETERMINING IFOID) IN VALUE AS FORM INFORMATION
// IFOID DESIGNATES ELEMENT OF ARRANGEMENT document.ITEM_OID[0]
// ITEM_OID_NO DESIGNATES 0 CORRESPONDING TO ARRANGEMENT NUMBER OF ARRANGEMENT document.ITEM_OID[0]
   parent.statusFrame.location.href = " progress.html?ITEM_OID_NO=0&IFOID=" + document.ITEM_OID [0];

// FOLLOWING FUNCTION PROCESS IS PERFORMED AT TIME CALLED FROM progress.html
//--------------------------------------------------------------------------------//
// FUNCTION NAME
// OUTLINE
//    ・RESERVE EACH INFORMATION IN progress.html (statusFrame)
//    ・CALCULATE PROGRESS RATE
// FACTOR: oid (IDENTIFIER OF ACQUISITION ITEM)
// RETURN VALUE: NONE
//--------------------------------------------------------------------------------//
function workStage(oid) {
    switch (oid) {
    case 1:// CASE OF NETWORK INTERFACE NAME
              var i=0;//INITIALIZE VARIABLE FOR ARRANGEMENT NUMBER
              document.Netif = new Array();//DECLARE ARRANGEMENT Netif

          // LOOP AS MUCH AS NUMBER OF ELEMENTS OF ARRANGEMENT INDEX_MIB IN statusFrame
             for (var i = 0; i < parent.statusFrame.document.INDEX_MIB.len  gth; i++) {
          // RESERVE INFORMATION OF NETWORK INTERFACE IN ARRANGEMENT Netif
          // (SUBSTITUTE INFORMATION OF EACH NETWORK INTERFACE INTO Netif [INDEX NUMBER])
             document.Netif[parent.statusFrame.document.INDEX_MIB[i]] =
parent.statusFrame.document.MIB[i];
             }                                                              A01
        break;
     case 2:// CASE OF STATUS
              var i=0;//INITIALIZE VARIABLE FOR ARRANGEMENT NUMBER
              document.Status = new Array();//DECLARE ARRANGEMENT Status

          // LOOP AS MUCH AS NUMBER OF ELEMENTS OF ARRANGEMENT INDEX_MIB IN statusFrame
             for (var i = 0; i < parent.statusFrame.document.INDEX_MIB.len  gth; i++) {
          // RESERVE INFORMATION OF STATUS IN ARRANGEMENT Status
```

FIG. 6

```
    //(SUBSTITUTE INFORMATION OF EACH STATUS INTO Status [INDEX NUMBER])
                document.Status[parent.statusFrame.document.INDEX_MIB[i]] =        A02
parent.statusFrame.document.MIB[i];
              }
          break;
    case 3:// CASE OF MAC ADDRESS
          OMISSION
    case 4:// CASE OF TYPE
          OMISSION
    case 5:// CASE OF SPEED
          OMISSION
    case 6:// CASE OF IP ADDRESS
          OMISSION
    case 7:// CASE OF SUBNET MASK
           var i=0;//INITIALIZE VARIABLE FOR ARRANGEMENT NUMBER
           document.SubnetMask = new Array();//DECLARE ARRANGEMENT SubnetMask

         // LOOP AS MUCH AS NUMBER OF ELEMENTS OF ARRANGEMENT INDEX_MIB IN statusFrame
          for (var i = 0; i < parent.statusFrame.document.INDEX_MIB.len    gth; i++) {
         //RESERVE INFORMATION OF SUBNET MASK IN ARRANGEMENT SubnetMask
         //(SUBSTITUTE INFORMATION OF EACH SUBNET MASK INTO SubnetMask [INDEX NUMBER])
           document.SubnetMask[parent.statusFrame.document.INDEX_MIB[i]]    =
parent.statusFrame.document.MIB[i];                                              A03
              }
          break;
    }
   //INCREASE PROGRESS (100/NUMBER OF KINDS OF ACQUISITION MIB)
   f_percent=f_percent+(100/document.ITEM_OID.length);
   //SET PROGRESS BAR PROGRESS RATE (INTEGER VALUE OBTAINED BY ROUNDING OFF DECIMAL PLACES)
    document.percent=Math.ceil(f_percent);
}
                                                                                 A04
```

FIG. 7

```
//------------------------------------------------------------------------//
DEFINE STYLE FOR DISPLAYING PROGRESS BAR
//------------------------------------------------------------------------//
<style type="text/css">
OMISSION
</style>

//------------------------------------------------------------------------//
// FUNCTION NAME : writeProgress
// OUTLINE: SET BAR WIDTH AND DIMENSION (%) FOR DISPLAYING PROGRESS BAR
//------------------------------------------------------------------------//
function writeProgress() {
OMISSION
}

//------------------------------------------------------------------------//
// FUNCTION NAME : onload_event
// OUTLINE: CALL onload_frame FUNCTION AT TIME OF DISPLAYING PRESENT progress.html (PROGRESS BAR)
//------------------------------------------------------------------------//
function onload_event() {
 setTimeout("onload_frame()", 0);//DISPLAY PROGRESS BAR AND CALL onload_frame FUNCTION
 return true;
}

//------------------------------------------------------------------------//
// FUNCTION NAME : onload_frame
// OUTLINE :
//    ・STORE INDEX NUMBER AND INFORMATION IN EACH ITEM IN ARRANGEMENT
//    ・CALL workStage FUNCTION IN work.html TO STORE INDEX NUMBER
//      AND INFORMATION STORED ABOVE IN ARRANGEMENT OF INFORMATION RESERVATION FRAME
//    ・RELOAD progress.html FOR INFORMATION ACQUISITION REQUEST OF NEXT ITEM OR ACQUIRE ENTIRE
//      INFORMATION, CALL disp.html IN SCREEN DISPLAY FRAME (SAME statusFrame) AFTER STORING
// FACTOR: NONE
// RETURN VALUE: NONE
//------------------------------------------------------------------------//
function onload_frame() {
    var i=0;//INITIALIZE VARIABLE FOR ARRANGEMENT NUMBER
    document.INDEX_MIB = new Array();//DECLARE ARRANGEMENT INDEX_MIB
    document.MIB = new Array();//DECLARE ARRANGEMENT MIB
```

```
//STORE ACQUIRED INDEX NUMBER AND INFORMATION AS ELEMENT OF ARRANGEMENT
//MANAGEMENT SOFTWARE DYNAMICALLY GENERATES FOLLOWING SCRIPT FROM EXISTENT INDEX NUMBER AND INFORMATION
//HEREIN, CASE OF ITEM OF Interface Name IS DESCRIBED BY WAY OF EXAMPLE

        document.INDEX_MIB[i] = "0" ;//STORE INDEX NUMBER
        document.MIB[i] = "eth0";//STORE INFORMATION
        i++; //ARRANGEMENT NUMBER + 1
        document.INDEX_MIB[i] = "1" ;//STORE INDEX NUMBER
        document.MIB[i] = "eth1";//STORE INFORMATION
        i++; //ARRANGEMENT NUMBER + 1
        document.INDEX_MIB[i] = "2" ;//STORE INDEX NUMBER
        document.MIB[i] = "eth2";//STORE INFORMATION
        i++; //ARRANGEMENT NUMBER + 1
        document.INDEX_MIB[i] = "3" ;//STORE INDEX NUMBER
        document.MIB[i] = "eth3";//STORE INFORMATION
        i++; //ARRANGEMENT NUMBER + 1
        document.INDEX_MIB[i] = "4" ;//STORE INDEX NUMBER
        document.MIB[i] = "eth4";//STORE INFORMATION
        i++; //ARRANGEMENT NUMBER + 1

//DYNAMICALLY GENERATED SCRIPT IS UP TO HERE
```

```
//TO STORE INDEX NUMBER AND INFORMATION STORED IN ARRANGEMENT ABOVE IN ARRANGEMENT OF INFORMATION RESERVATION FRAME
//CALL workStage FUNCTION IN work.html of INFORMATION RESERVATION FRAME (workFrame)
parent.workFrame.workStage(<%FORM:IFOID%>);//IDENTIFIER (CGI PARAMETER VALUE OF IFOID) OF ACQUISITION ITEM ENTERS <%FORM:IFOID%>

// ITEM_OID ARRANGEMENT + 1
var item_oid_no=<%FORM:ITEM_OID_NO%>+1;//ITEM_OID ARRANGEMENT NUMBER (CGI PARAMETER VALUE OF ITEM_OID_NO)
                                        FOR DETERMINING IFOID ENTERS <%FORM:ITEM_OID_NO%>        } A09

//CASE WHERE THERE IS ELEMENT OF ITEM_OID ARRANGEMENT DEFINING IDENTIFIER OF NEXT ACQUISITION ITEM
  (CASE WHERE THERE IS ITEM TO BE ACQUIRED NEXT)
if (item_oid_no in parent.workFrame.document.ITEM_OID) {

  //SET IDENTIFIER OF NEXT ACQUISITION ITEM
  var oid=parent.workFrame.document.ITEM_OID[item_oid_no];

  //RELOAD FOR ACQUISITION REQUEST OF NEXT ACQUISITION ITEM
  //DESIGNATE IFOID (IDENTIFIER OF ACQUISITION ITEM), ITEM_OID_NO (ITEM_OID ARRANGEMENT NUMBER
    FOR DETERMINING IFOID) IN VALUE AS FORM INFORMATION
   location.href = "progress.html?IFOID=" + oid + "&ITEM_OID_NO=" + item_oid_no;        } A08
                                                                        }
else //CASE WHERE THERE IS NO ELEMENT OF ITEM_OID ARRANGEMENT DEFINING IDENTIFIER OF NEXT ACQUISITION ITEM
      (CASE WHERE THERE IS NO ITEM TO BE ACQUIRED NEXT)
  //SINCE ACQUISITION OF ALL ITEMS IS COMPLETED, disp.html is called
  location.href = "disp.html";                                                          } A10

//-------------------------------------------------------------------------------//
HEREINAFTER, body PORTION OF HTML OF PROGRESS BAR DISPLAY
//-------------------------------------------------------------------------------//
<body onLoad="writeProgress();onload_event();">
OMISSION
</body>                                                                                  } A06
```

FIG. 10

| Interface Name | Status | MAC Address | Type | Speed | IP Address | Subnet Mask |
|---|---|---|---|---|---|---|
| eth0 | Up | 00:0B:5D:xx:xx:xx | Ether | 100Mbps | 192.168.x.x | 255.255.255.0 |
| eth1 | Down | 00:0B:5D:xx:xx:xx | Ether | 100Mbps | - | - |
| eth2 | Up | 00:0B:5D:xx:xx:xx | Ether | 100Mbps | 192.168.x.x | 255.255.255.0 |
| eth3 | Up | 00:0B:5D:xx:xx:xx | Ether | 100Mbps | 192.168.x.x | 255.255.255.0 |
| eth4 | Down | 00:0B:5D:xx:xx:xx | Ether | 10Mbps | - | - |

FIG. 11

```
<body>
//MANAGEMENT SOFTWARE DYNAMICALLY GENERATES FOLLOWING SCRIPT BY REPEATING
//AS MUCH AS NUMBER OF INDEXES OF EXISTENT NETWORK
//IN EMBODIMENT, THERE ARE FIVE INDEXES OF eth0 TO eth4,
  AND FOLLOWING SCRIPT IS GENERATED BY REPETITION FIVE TIMES
//HEREIN, ONLY ONCE (ONE INDEX) IS DESCRIBED BY WAY OF EXAMPLE
<table>
<tr>
<td>
<script language="JavaScript"><!--                                                          ┐
//DISPLAY INTERFACE NAME THAT IS ELEMENT OF ARRANGEMENT Netif [INDEX NUMBER] IN workFrame   ├ A11
     document.write(parent.workFrame.document.Netif[INDEX NUMBER]);                         │
// --></script>                                                                             ┘
</td>
<td>
<script language="JavaScript"><!--                                                    ┐
//DISPLAY STATUS THAT IS ELEMENT OF ARRANGEMENT Status [INDEX NUMBER] IN workFrame   ├ A12
 document.write(parent.workFrame.document.Status[INDEX NUMBER]);                      │
// --></script>                                                                       ┘
</td>
<td>
<script language="JavaScript"><!--
//DISPLAY MAC ADDRESS
     OMISSION
// --></script>
</td>
<td>
<script language="JavaScript"><!--
//DISPLAY TYPE
     OMISSION
// --></script>
</td>
<td>
<script language="JavaScript"><!--
//DISPLAY SPEED
     OMISSION
// --></script>
</td>
<td>
<script language="JavaScript"><!--
//DISPLAY IP ADDRESS
     OMISSION
// --></script>
</td>
<td>
<script language="JavaScript"><!--
```

FIG. 12

```
//DISPLAY SUBNET MASK THAT IS ELEMENT OF ARRANGEMENT SubnetMask [INDEX NUMBER] IN workFrame
     document.write(parent.workFrame.document.SubnetMask[INDEX NUMBER]);
// --></script>
</td>
</tr>
  </table>
//SCRIPT DYNAMICALLY GENERATED BY REPETITION IS UP TO HERE
</body>
```

```
//CALL NetworkInterface SCREEN (old.html) IN NON-DIVISION ACQUISITION MODE TO SCREEN DISPLAY FRAME (statusFrame)

parent.statusFrame.location.href = "old.html";
```

FIG. 21

| Interface Name | Status | MAC Address | Type | Speed | IP Address | Subnet Mask |
|---|---|---|---|---|---|---|
| eth0 | Up | 00:0B:5D:xx:xx:xx | Ether | 100Mbps | 192.168.x.x | 255.255.255.0 |
| eth1 | Down | 00:0B:5D:xx:xx:xx | Ether | 100Mbps | - | - |
| eth2 | Up | 00:0B:5D:xx:xx:xx | Ether | 100Mbps | 192.168.x.x | 255.255.255.0 |
| eth3 | Up | 00:0B:5D:xx:xx:xx | Ether | 100Mbps | 192.168.x.x | 255.255.255.0 |
| eth4 | Down | 00:0B:5D:xx:xx:xx | Ether | 10Mbps | - | - |

FIG. 22

```
// DEFINE ACQUISITION INFORMATION IDENTIFIER (IFOID = X, Y) AS ARRANGEMENT ITEM_OID_X, ITEM_OID_Y
document.ITEM_OID_X = new Array(1,2,3,4,5,6,7);// DISPLAY ACQUIRED ITEMS (Interface Name, Status, ···, Subnet Mask)
document.ITEM_OID_Y = new Array(0,1,2,3,4);// DISPLAY LINE NUMBER OF ACQUIRED INFORMATION (FOR EXAMPLE, eth0, eth1, ···, eth4).
ACTUALLY IT IS NECESSARY TO ACQUIRE INFORMATION ABOUT NUMBER OF LINES OF INFORMATION ACQUIRED
IN ADVANCE FROM MANAGEMENT SOFTWARE

// CALL DIVISION INFORMATION REQUEST FRAME progress.html for SUBDIVISION TO DIVISION INFORMATION REQUEST FRAME (statusFrame)
// ITEM_OID_NO DESIGNATES 0 CORRESPONDING TO ARRANGEMENT NUMBER OF ARRANGEMENT document.ITEM_OID_X[0]
AND 0 CORRESPONDING TO ARRANGEMENT NUMBER OF document.ITEM_OID_Y[0]
// INFOID DESIGNATES ELEMENTS OF ARRANGEMENT document.ITEM_OID_X[0] AND document.ITEM_OID_Y[0]

  parent.statusFrame.location.href = " progress.html?ITEM_OID_NO=0,0& IFOID=" + document.ITEM_OID_X [0]+ ","+ document.ITEM_OID_Y [0];   } A14
```

FIG. 25

MONITORING SCREEN - WWW BROWSER

Network Interfaces

| Interface Name | Status | MAC Address | Type | Speed | IP Address | Subnet Mask |
|---|---|---|---|---|---|---|
| eth0 | Up | 00:0B:5D:xx:xx:xx | Ether | 100Mbps | 192.168.x.x | 255.255.255.0 |
| eth1 | Down | 00:0B:5D:xx:xx:xx | Ether | 100Mbps | - | - |
| eth2 | Up | 00:0B:5D:xx:xx:xx | Ether | 100Mbps | 192.168.x.x | 255.255.255.0 |
| eth3 | Up | 00:0B:5D:xx:xx:xx | Ether | 100Mbps | 192.168.x.x | 255.255.255.0 |
| eth4 | Down | 00:0B:5D:xx:xx:xx | Ether | 10Mbps | - | - |

INFORMATION PROCESSING APPARATUS, INFORMATION ACQUIRING METHOD, AND COMPUTER READABLE RECORDING MEDIUM IN WHICH INFORMATION ACQUISITION PROGRAM IS STORED

CROSS-REFERENCE TO RELATED APPLICATIONS

This application is a continuation application of PCT international application No. PCT/JP2011/054104, filed on Feb. 24, 2011, the entire contents of which are incorporated herein by reference.

FIELD

The embodiments discussed herein are directed to a technique of acquiring information from an information generating device.

BACKGROUND

As an interface that executes a user program on a web server, for example, a common gateway interface (CGI) is known. The CGI is a program put on a web server (WWW server), and performs a process according to a CGI request from a web browser. The web browser displays hypertext markup language (HTML) data acquired from the CGI. Accordingly, a user can see a process result output on the web browser, through a client terminal (PTL 1 disclosed below).

For example, in a network management system, there is an example of collecting information about a system configuration and the like of a monitoring target machine and confirming (monitoring) information illustrated in FIG. 25 using the web browser in the client terminal from the collected information.

FIG. 25 is a diagram illustrating an example of a monitoring screen in the network management system. In the example illustrated in FIG. 25, a list of information about network interfaces (NIC) is represented as the monitoring screen.

In the web browser of the client terminal, for example, when a display request of a web page presenting information about the network interface is made, an information collection request from the web browser of the client terminal is transmitted to the web server.

The web server starts up the CGI, and the CGI requests management software installed in the monitoring target machine to generate monitoring screen data.

In the monitoring target machine, the management software collects information about the network interface, acquires all necessary information, and then generates HTML data of the monitoring screen illustrated in FIG. 25 using such information.

The management software transmits the generated HTML data to the CGI of the web server. The web server transmits the HTML to the web browser, and inactivates the CGI.

[Patent Literature 1] Japanese Laid-open Patent Publication No. 2006-243789

However, in such a web page display control method of the related art, when an amount of displayed information is large, for example, when the number of NICs provided in the monitoring target machine is large or when the number of displayed items is large, the size of the generated monitoring screen data (HTML) is also increased.

Accordingly, in the web server, there is a problem in that the CGI processes large-size HTML data at once and thus an amount of used memory resources of the web server is temporarily increased to be a high-load state. Generally, since the web server has a configuration without an external storage device, there is a limit in resources which can be used at once.

In addition, generally, an information acquisition program has a CGI time-out function of forcibly inactivating the CGI when an elapsed time after starting up the CGI is over a predetermined time, to prevent the amount of used resources from increasing due to the CGI.

When the amount of information collected in the management software is very large, a time is taken in an information acquiring process in the management software and HTML data transmission from the web server (CGI) to the web browser. Accordingly, the process may be forcibly finished by the CGI time-out although the process is being performed. Accordingly, there is also a problem in that the CGI is forcibly inactivated before the transmission of the HTML data to the web browser is completed, and it is difficult to normally perform displaying of the monitoring screen in the web browser.

SUMMARY

According to an aspect of the invention, there is provided an information processing apparatus which is connected to a web server through a communication line and makes an information acquisition request with respect to an information generating device through the web server to acquire information from the information generating device, the information processing apparatus including: a division information acquisition requesting unit that transmits a plurality of division information acquisition requests obtained by dividing the information acquisition request to the information generating device through the web server; a division response information acquiring unit that acquires division response information corresponding to the division information acquisition requests from the information generating device through the web server; an information storing unit that stores the acquired division response information; and an output information generating unit that generates output information using the stored division response information.

According to another aspect of the invention, there is provided an information acquiring method in which an information processing apparatus connected to a web server through a communication line makes an information acquisition request with respect to an information generating device through the web server to acquire information from the information generating device, the information acquiring method including: transmitting the information acquisition request in a non-division state to the information generating device through the web server; detecting occurrence of a first response delay when not acquiring response information from the web server with respect to the information acquisition request within a first reference time; transmitting a plurality of division information acquisition requests obtained by dividing the information acquisition request to the information generating device through the web server when the first response delay is detected; acquiring division response information corresponding to the division information acquisition requests from the information generating device through the web server; storing the acquired division response information; and generating output information using the stored division response information.

According to still another aspect of the invention, there is provided a computer readable recording medium in which an information acquisition program for causing a computer connected to a web server through a communication line to execute making an information acquisition request with respect to an information generating device through the web server to acquire information from the information generating device is recorded, wherein the information acquisition program causes the computer to execute: transmitting a plurality of division information acquisition requests obtained by dividing the information acquisition request to the information generating device through the web server; acquiring division response information corresponding to the division information acquisition requests from the information generating device through the web server; storing the acquired division response information; and generating output information using the stored division response information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of collection target information in the network system as an example of the first embodiment;

FIG. 5 is a diagram illustrating an example of a script of work.html of an information reservation frame in the network system as an example of the first embodiment;

FIG. 6 is a diagram illustrating an example of a script of work.html of an information reservation frame in the network system as an example of the first embodiment;

FIG. 7 is a diagram illustrating an example of a script of progress.html of a division information request frame in the network system as an example of the first embodiment;

FIG. 8 is a diagram illustrating an example of a script of progress.html of a division information request frame in the network system as an example of the first embodiment;

FIG. 9 is a diagram illustrating an example of a script of progress.html of a division information request frame in the network system as an example of the first embodiment;

FIG. 10 is a diagram illustrating a method of acquiring information of an information collection target in the network system as an example of the first embodiment;

FIG. 11 is a diagram illustrating an example of a script of disp.html of a screen display frame in the network system as an example of the first embodiment;

FIG. 12 is a diagram illustrating an example of a script of disp.html of a screen display frame in the network system as an example of the first embodiment;

FIG. 20 is a diagram illustrating an example of a method of realizing an information acquisition request in a non-division acquisition mode in the network system as an example of the second embodiment;

FIG. 21 is a diagram illustrating a method of acquiring information of an information collection target in the network system as an example of the second embodiment;

FIG. 22 is a diagram illustrating an example of a script for realizing cell unit division acquisition in the network system as an example of the second embodiment;

FIG. 25 is a diagram illustrating an example of a monitoring screen in a network management system.

DESCRIPTION OF EMBODIMENT(S)

Hereinafter, embodiments of the invention will be described with reference to the drawings.

(A) First Embodiment

Figure 1:
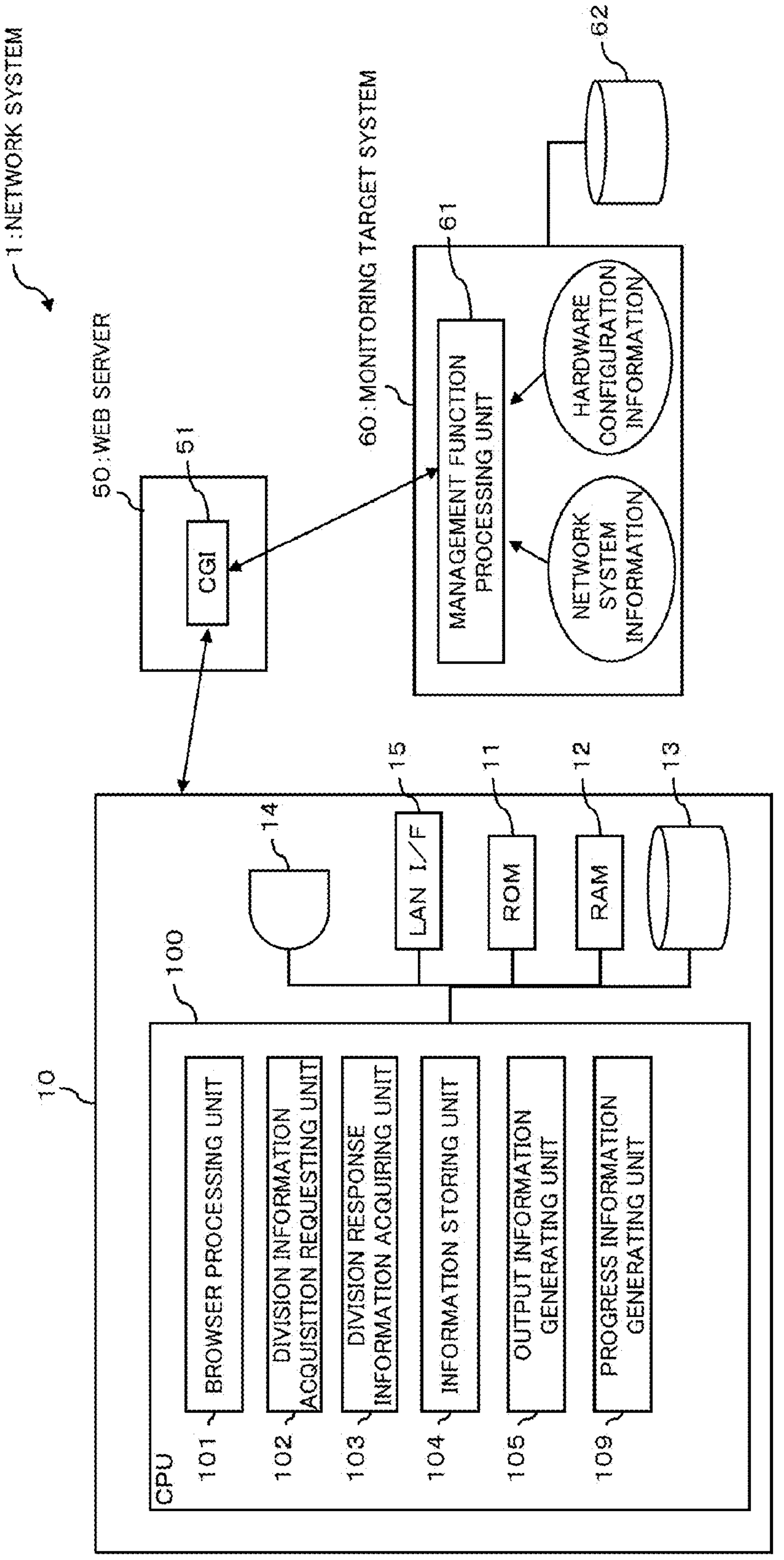
FIG. 1 is a diagram schematically illustrating a functional configuration of a network system as an example of a first embodiment.

FIG. 1 is a diagram schematically illustrating a functional configuration of a network system as an example of a first embodiment.

As illustrated in FIG. 1, a network system 1 of the first embodiment includes a web server 50, a monitoring target system 60, and a client terminal 10. The client terminal 10 and the monitoring target system 60 are connected to the web server 50 so as to communicate with each other through a communication network (not illustrated) (for example, the Internet).

In the network system 1, a user collects various information from the communication network using the client terminal 10. In the embodiment, an example in which the user collects information about a system configuration of the monitoring target system 60 using the client terminal 10 is described.

The web server 50 is an information processing apparatus (a computer) having a server function, and provides data (web data) such as HTML and objects (for example, images) for the web browser of the client terminal 10. The web server 50 includes a central processing unit (CPU), a memory, and a storage device, which are not illustrated such that the CPU executes an operating system (OS) and various programs to realize various functions.

In addition, the web server 50 includes a CGI 51. The CGI 51 is a program interface that executes various processes according to a request from a web browser 120 (see FIG. 13) of the client terminal 10, in the web server 50. In the web server 50, the CPU executes a program to realize a function as the CGI 51.

The web server 50 executes the CGI 51 to process a process request (a division information acquisition request, details of which will be described later) transmitted from the client terminal 10. Specifically, the CGI 51 instructs a management function processing unit 61 of the monitoring target system 60 to be described later to generate and transmit response information (HTML data) according to the process request transmitted from the client terminal 10. In addition, the CGI 51 transmits HTML data (division response information, details of which will be described later) transmitted from the management function processing unit 61, to the web browser 120 of the client terminal 10. Note that the function as the CGI 51 may be realized using various existing methods, details of which are not described.

The monitoring target system 60 is an information processing apparatus including a storage device 62, a CPU and a memory which are not described, and includes a plurality of network interfaces to have a function as a network relay device in the embodiment.

In the monitoring target system 60, the CPU executes an OS and various programs to realize various functions. For example, the CPU executes management software stored in the storage device 62 to serve as the management function processing unit 61 to be described later.

The storage device 62 is, for example, a hard disk drive (HDD), and stores various programs including the program (the management software) for realizing the function as the management function processing unit 61, an OS, and various data.

In addition, the storage device 62 also stores forms of various HTML data presented to the web browser of the client terminal 10 to be described later. Such HTML data also includes web page data WD1 (see FIG. 4) to be described later.

The management function processing unit 61 generates JavaScript and HTML data constituting the web page data WD1 according to a call from the web browser of the client terminal 10, and transmits them to the web browser of the client terminal 10 through the CGI 51 of the web server 50.

The monitoring target system 60 stores, for example, HTML data constituting a monitoring information collection screen 141 (see FIG. 3) to be described later, in the storage device 62. The HTML data is transmitted to the client terminal 10 through the web server 50, according to a process request (an access request) from the client terminal 10.

In addition, the monitoring target system 60 generates information (response information) transmitted (presented) to the client terminal 10, according to a request from the client terminal 10 transmitted through the CGI 51. Specifically, the monitoring target system 60 generates the web page data WD1 (the HTML data to be described later) constituting the response information, by executing the management software by the CPU. In addition, the web page data WD1 is displayed on a display 14 by the web browser 120 (see FIG. 3) in the client terminal 10, and also serves as output information.

In the first embodiment, the management function processing unit 61 collects, for example, information about a system configuration of the monitoring target system 60, according to the process request from the client terminal 10. In addition, the monitoring target system 60 generates HTML data of a web page which can be displayed on the web browser of the client terminal 10, to present the collected information to the user of the client terminal 10.

The information about the system configuration of the monitoring target system 60 is information representing a hardware configuration, a configuration and a state of the network system. Such information is collected, for example, by executing a predetermined command provided in the OS or the like, in the monitoring target system 60, and may be realized using various existing methods.

Hereinafter, in the embodiment, an example is described in which the information about the system configuration is collection target information and information of the Network Interface provided in the monitoring target system 60 is collected and output as the output information to the client terminal 10.

FIG. 2 is a diagram illustrating an example of the collection target information in the network system 1 as an example of the first embodiment. In the example illustrated in FIG. 2, information of network interfaces is represented as the collection target information. In the example illustrated in FIG. 2, each of a plurality (five in the example) of network interfaces is associated with information of seven items of Interface Name, Status (States), MAC Address, Type, Speed, IP Address, and Subnet Mask.

The management function processing unit 61 collects the information of such seven items for each network interface (for each index) provided in the monitoring target system 60.

In the example illustrated in FIG. 2, Interface Name, Status, MAC Address, Type, Speed, IP Address, and Subnet Mask are represented in a table form with respect to each of five indexes represented by the interface names eth0 to eth4. That is, the plurality of network interfaces is disposed as lines, and the plurality of items is disposed as columns.

Note that, hereinafter, the individual network interface provided in the monitoring target system 60 is specified using an index number that is unique identification information. In the embodiments, integers (0, 1, 2, 3, and 4) starting from 0 are used as the index numbers.

Herein, Interface Name is a name for identifying the network interface, and Status represents any states of starting-up (up) or inactivating (down) of the network interface. Type represents a type of standard in which the network interface is compliant, and Speed is performance (speed) of the network interface. Note that, in FIG. 2, a character "x" indicates a place of any alphanumeric character, for convenience.

The monitoring target system 60 acquires such information, according to the request from the web browser of the client terminal 10, and processes the information as the HTML data to be transmitted to the client terminal 10. For example, the monitoring target system 60 inserts (writes) the acquired information (the interface name and the like) into a predetermined place of a form of the HTML data stored in advance in the storage device 62, to generate the HTML data. That is, the management function processing unit 61 generates various HTML data using the form.

In addition, the monitoring target system 60 generates the HTML data for each process request transmitted from the client terminal 10 to be described later, and sequentially transmits the generated HTML data to the CGI 51 of the web server 50.

That is, whenever a partial information acquisition request is made from the client terminal 10 to be described later through the web server 50, the monitoring target system 60 generates the HTML data (partial response information) for the partial information acquisition request. The monitoring target system 60 transmits the generated HTML data, on a case-by-case basis, to the client terminal 10 through the CGI 51 of the web server 50.

That is, the monitoring target system 60 generates and transmits the HTML data (partial response information), by a unit of the partial information acquisition request transmitted from the client terminal 10 to be described later through the web server 50.

As illustrated in FIG. 1, the client terminal 10 is an information processing apparatus including a CPU 100, a ROM 11, a RAM 12, a storage device 13, a display 14, and a local area network (LAN) interface (I/F) 15. The user acquires, for example, the information about the system configuration of the monitoring target system 60 using the client terminal 10.

The ROM 11 is a storage device that stores an OS and programs executed by the CPU 100, and various data. The RAM 12 is a storage area for temporarily storing various data and programs and is used in which the data and program are temporarily stored and developed when the CPU 100 execute the program. The storage device 13 stores various data and programs to be readable and writable, and is, for example, an HDD or a solid state drive (SSD). The LAN interface 15 connects the web server 50 or the monitoring target system 60 through the communication network to be communicable, and is, for example, a LAN card.

The CPU 100 is a processing device performing various controls and operations, and executes an OS or a program stored in the ROM 11 or the storage device 13 to realize various functions. The CPU 100 executes the program of the web browser to serve as a browser processing unit 101.

The browser processing unit 101 processes the HTML data and the like constituting the web page, and outputs the web page to an output device such as the display 14 and a printer (not illustrated), or executes various scripts (JavaScript and the like) included in the HTML data. The web browser may be, for example, Internet Explorer (registered trademark), Mozilla Firefox (registered trademark), Safari (registered trademark), Opera (registered trademark), Google Chrome (registered trademark), or the like. Note that the web browser is not limited thereto, and may be variously modified.

Figure 3:
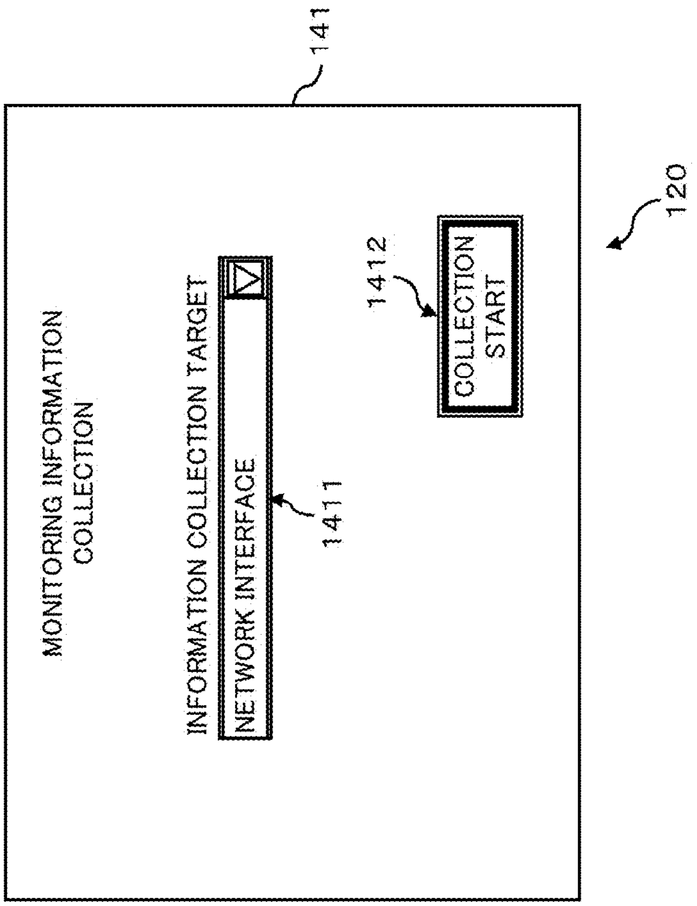
FIG. 3 is a diagram illustrating an example of a monitoring information collection screen in the network system as an example of the first embodiment.

FIG. 3 is a diagram illustrating an example of a monitoring information collection screen 141 in the network system 1 as an example of the first embodiment.

The monitoring information collection screen 141 exemplified in FIG. 3 is a menu screen for instructing the monitoring target system 60 to collect information. In the client terminal 10, the browser processing unit 101 controls the web browser to process the HTML data of the monitoring information collection screen 141, and the monitoring information collection screen 141 is thereby displayed on the display 14.

As exemplified in FIG. 3, the monitoring information collection screen 141 includes a monitoring target input unit 1411 and a collection start instruction input unit 1412.

The monitoring target input unit 1411 specifies (selects, designates) information of a monitoring (information collection) target, to which information desired to be acquired by the user is input. In the example illustrated in FIG. 3, the monitoring target input unit 1411 is configured by a pull-down menu, and a case of selecting information about the network interface provided in the monitoring target system 60 as the information collection target is described.

Note that the information collection target is not limited to the network interface. For example, the information collection target may be information of the other device or software provided in the monitoring target system 60, and variously modified. In addition, the information collection target input unit 1411 is not limited to the pull-down menu, and may be variously modified. For example, a checkbox or a toggle button may be disposed adjacent to an information collection target candidate, and the information collection target may be selected by such a checkbox or toggle button. In addition, in this case, a plurality of monitoring targets may be selected.

The collection start instruction input unit 1412 is an instruction input unit for the user to input an information acquisition instruction about the information collection target input to the information collection target input unit 1411. The user selects (presses down) the collection start instruction input unit 1412 using an input device (not illustrated) such as a mouse and a keyboard in the client terminal 10, to confirm the information collection target input to the information collection target input unit 1411. Accordingly, an information acquisition request of requesting information about the confirmed information collection target to the monitoring target system 60 is generated.

The information acquisition request is to request acquisition of the output information illustrated in FIG. 2, and requests information about one or more (seven in the embodiment) prescribed items to the information collection target (for example, the network interface) provided in the monitoring target system 60. In addition, in the monitoring target system 60, when a plurality of devices corresponding to the information collection target is provided, the information of the items is requested for all such devices.

That is, the CPU 100 serves as an information acquisition request generating unit that generates the information acquisition request for the monitoring target in the monitoring target system 60. The generated information acquisition request is transmitted to the monitoring target system 60 through the CGI 51 of the web server 50.

In addition, in the client terminal 10, the browser processing unit 101 processes the web page data WD1 transmitted from the monitoring target system 60 through the web server 50 using the web browser, to realize functions as a division information acquisition requesting unit 102, a division response information acquiring unit 103, an information storing unit 104, and an output information generating unit 105, which will be described later.

That is, in the client terminal 10, the CPU 100 (the browser processing unit 101) processes the web page data WD1 such that the CPU 100 serves as the division information acquisition requesting unit 102, the division response information acquiring unit 103, the information storing unit 104, the output information generating unit 105, and a progress information generating unit 109.

Figure 4:
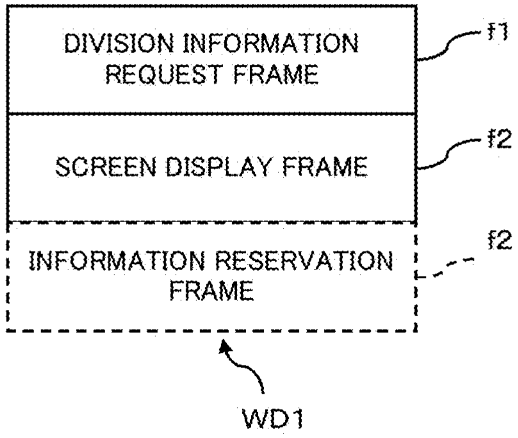
FIG. 4 is a diagram schematically illustrating an example of a configuration of web page data in the network system as an example of the first embodiment.

FIG. 4 is a diagram schematically illustrating an example of a configuration of the web page data WD1 in the network system as an example of the first embodiment.

As illustrated in FIG. 4, the web page data WD1 includes a division information request frame f1, a screen display frame f2, and an information reservation frame f3.

In the information reservation frame f3, division response information acquired in the division information request frame f1 is reserved, and predetermined information in progress.html of the division information request frame f1 to be described later is extracted and stored. Note that the information reservation frame f3 may have a frame size of 0, and may be handled as an (non-displayed) area which is not displayed on the display 14.

The browser processing unit 101 processes the information reservation frame f3 such that the CPU 100 serves as the information storing unit 104.

FIG. 5 and FIG. 6 are diagrams illustrating an example of a script of work.html of the information reservation frame f3 in the network system 1 as an example of the first embodiment, and FIG. 6 illustrates a process subsequent to FIG. 5. Note that, hereinafter, in the script, a line starting from a character string "//" represents a comment line.

In the embodiment, the information reservation frame f3 includes HTML data work.html. In addition, hereinafter, the information reservation frame f3 may be represented by workFrame.

In the examples illustrated in FIG. 5 and FIG. 6, work.html is provided with definition of an identifier of an acquisition item, and is provided with a workStage function.

The workStage function is provided with an arrangement variable document.Netif (see signs A01 to A03 of FIG. 5 and FIG. 6), and document.Netif has a function of reserving information stored in document.MIB[i] of progress.html.

In the embodiment, the workStage function in work.html is read to reserve predetermined information (document.MIB [i]) in progress.html in the arrangement variable document.Netif in work.html. In addition, in this case, a value of FORM information IFOID is designated as a factor oid. Note that, hereinafter, the FORM information may be referred to as a FORM identifier.

In addition, work.html has a calculation function of a progress rate to update a progress bar, and has a function of performing calculation of the progress rate (progress information) (see the sign A04 of FIG. 6).

The division information request frame f1 is a frame describing a division information request script. The division information request script transmits a plurality of division information acquisition requests obtained by dividing the information acquisition request described above in the monitoring target system 60, to the client terminal 10 through the web server 50.

In the embodiment, the division information request frame f1 is provided with HTML data progress.html. In addition, hereinafter, the division information request frame f1 may be represented by statusFrame.

In the first embodiment, in the division information request frame f1, the information acquisition request for the information collection target is made by a plurality of acquisition requests (division information acquisition requests) for each item constituting the information.

For example, in the information of the network interface illustrated in FIG. 2, in the division information request frame f1, the information acquisition request is made for each item to the monitoring target system 60. That is, the information about the network interface represented as a table form illustrated in FIG. 2 is acquired for each line.

Specifically, in the example illustrated in FIG. 2, in the division information request frame f1, the information acquisition request for the monitoring target system 60 is made in division of seven items of Interface Name, Status, MAC Address, Type, Speed, IP Address, and Subnet Mask.

A unique identifier (FORM information IFOID) is set in advance to each of such items. For example, IFOID=1 is prescribed in Interface Name, IFOID=2 is prescribed in Status, IFOID=3 is prescribed in MAC Address, IFOID=4 is prescribed in Type, IFOID=5 is prescribed in Speed, IFOID=6 is prescribed in IP Address, and IFOID=7 is prescribed in Subnet Mask.

In the division information request frame f1, a load request (a division information acquisition request) with any one of such identifiers as a factor is made to the management function processing unit 61 of the monitoring target system 60, to acquire the information of the item corresponding to the identifier. That is, the load request with several identifiers as factors is made to the management function processing unit 61 to make the division information acquisition request. Specifically, for example, progress.html?IFOID=1 is loaded by a location.href property to acquire the information of the interface name.

In addition, in this case, in the management function processing unit 61, the information of the item specified by the identifier of the IFOID is collected (acquired), and the HTML data (the division response information) including the collected information is generated. That is, the management function processing unit 61 specifies the information collection target from identifier of the IFOID attached as a factor.

For example, when IFOID=1 is attached as the factor to the information acquisition request, the management function processing unit 61 generates the HTML data based on INDEX numbers that is serial numbers of all the network interfaces and the interface name information.

Note that, as a method of generating the collected information as the HTML data, for example, as described above, the acquired information is inserted into a predetermined place of the form of the HTML data stored in advance in the storage device 62, to generate the HTML data. Note that the generation of the HTML data may be realized by various existing methods, but is not limited to the method. The generation of the HTML data may be realized by various modified methods.

The HTML data generated by the management function processing unit 61 is transmitted to the client terminal 10 through the CGI 51 of the web server 50, and is reflected to the division information request frame f1 (for example, see FIG. 6B).

That is, in the division information request frame f1, the division response information from the monitoring target system 60 corresponding to the transmitted division information acquisition request is acquired through the web server 50.

It could be said that the browser processing unit 101 processes the division information request frame f1 such that the CPU 100 serves as the division information acquisition requesting unit 102, the division response information acquiring unit 103, and the progress information generating unit 109.

In addition, the division information request frame f1 has a progress display function of representing an acquisition state of the response (the division response information) for the information acquisition request, as a progress situation.

In the embodiment, as described above, the information acquisition request is made by a plurality of division information acquisition requests obtained by dividing the information acquisition request by the number of items constituting the information of the collection target. Thus, according thereto, a ratio of the acquired division response information for the response information is used as a progress situation. Specifically, a value of document.percent (a progress rate) in work.html of the information reservation frame f3 to be described later is reflected. In addition, the progress situation is represented, for example, as a progress bar on the display 14.

Note that progress.html includes style definition for displaying the progress bar and various settings.

FIG. 7 to FIG. 9 are diagrams illustrating an example of a script of progress.html of the division information request frame f1 in the network system 1 as an example of the first embodiment, FIG. 8 illustrates a process subsequent to FIG. 7, and FIG. 9 illustrates a process subsequent to FIG. 8. In addition, FIG. 10 is a diagram illustrating a method of acquiring information of the information collection target in the network system 1 as an example of the first embodiment.

In the example illustrated in FIG. 7 to FIG. 9, progress.html includes, for example, style definition for the progress bar display and HTML of the progress bar display in addition to functions such as writeProgress, onload_event, and onload_frame (signs A05 and A06 of FIG. 7 and FIG. 9).

The writeProgress function sets a bar width and a numerical value (%) for the progress bar display, and the onload_event function calls the onload_frame function at the time of displaying the progress bar. Note that the style definition for the progress bar display and the writeProgress function may be realized using various existing methods, and the description thereof is not repeated.

The onload_frame function stores the acquired information in arrangement in association with the index number (see the sign A07 of FIG. 8), and then the workStage function in work.html is called. Accordingly, the index number in each item and the information are stored in arrangement, and the stored index number and the information are stored in arrangement of the information reservation frame f3.

In addition, in the onload_frame function, progress.html is reloaded by the location.href property, to make the information acquisition request of the next item in the information collection target (see the sign A08 of FIG. 9). In this case, as parameters, IFOID and ITEM_OID_NO are used.

An item_oid_no (an ITEM_OID arrangement number) used in the parameter ITEM_OID_NO is subjected to increment in the previous step (see the sign A09 of FIG. 8), and thus the information of the next item subsequent to the item acquired in the previous load is acquired.

The management function processing unit 61 collects the information of the item for which the load is requested by the onload_frame function, and the HTML data is generated and transmitted to the CGI 51.

The reload of progress.html is repeated until the information acquisition about all the items constituting the information collection target is performed (see the sign A10 of FIG. 9).

Accordingly, as illustrated in FIG. 10, the information about the information collection target (the network interface in the example) illustrated in FIG. 2 is collected for each item, and the HTML data is generated. Note that FIG. 10 illustrates the collection target information as a table formed of lines (individual network interfaces) and columns (items). FIG. 10 illustrates that the collection target information is acquired (information acquisition) by a unit of items with respect to the plurality of information collection targets as indicated by surrounding with broken-line rings in the figure.

That is, in the first embodiment, as illustrated in FIG. 10, the collection target information is repeatedly acquired (information acquisition) by a unit of items with respect to the plurality of network interfaces (indexes, information collection targets), to acquire the whole of the collection target information.

The onload_frame function acquires the information for all the items constituting the information collection target, and calls disp.html to the screen display frame f2 (the same statusFrame).

In the screen display frame f2, the output information is generated using the division response information stored in the information reservation frame f3. The output information is information output to an output device such as the display 14 or the printer (not illustrated), and is presented to the user of the client terminal 10. Note that the output screen has the same or substantially the same external appearance as that of the monitoring screen data in the network management system illustrated in FIG. 25.

In the screen display frame f2, the HTML data disp.html is provided, information is read from an arrangement variable in work.html of the information reservation frame f3 at the time of displaying disp.html on the screen, and such information is inserted into a preset table format. Accordingly, the monitoring screen data (the output information) described above is generated. In addition, the table format is provided for each information collection target.

The browser processing unit 101 processes the screen display frame f2 such that CPU 100 serves as the output information generating unit 105.

FIG. 11 and FIG. 12 are diagrams illustrating an example of a script of disp.html of the screen display frame f2 in the network system 1 as an example of the first embodiment, and FIG. 12 illustrates a process subsequent to FIG. 11.

In the example illustrated in FIG. 11 and FIG. 12, in disp.html, information of seven items of Interface Name, Status, MAC Address, Type, Speed, IP Address, and Subnet Mask is displayed for one index of the network interface.

Specifically, for example, elements in each arrangement such as Netif [index number] and Status [index number] in workFrame are written using a document.write( ) method (see signs A11 to A13 of FIG. 11 and FIG. 12).

The writing of each of such items is performed for all the indexes (eth0 to eth4) constituting the network interface.

Figure 14:
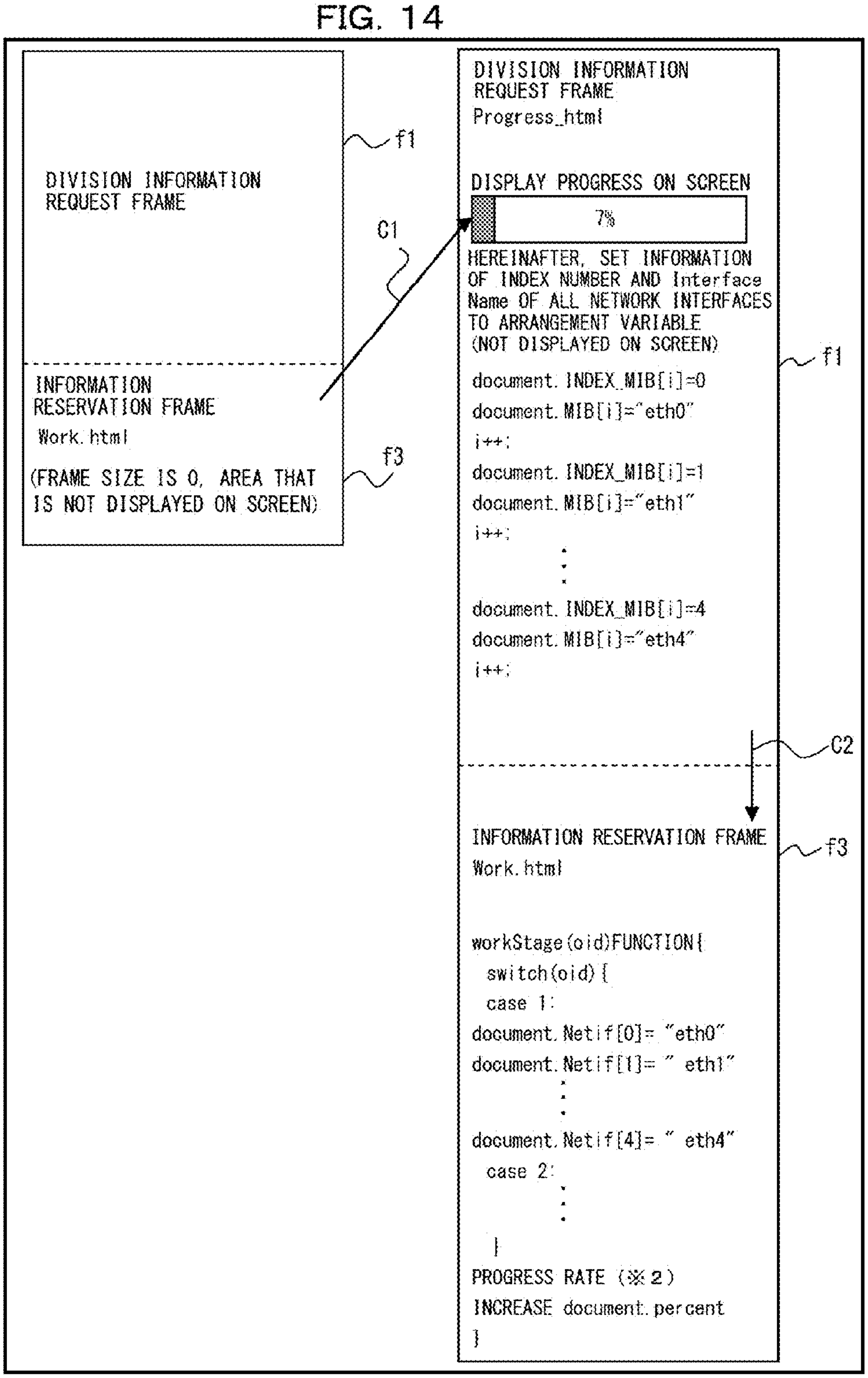
FIG. 14 is a diagram illustrating an example of a process of each frame of the web page data in the network system as an example of the first embodiment.
Figure 15:
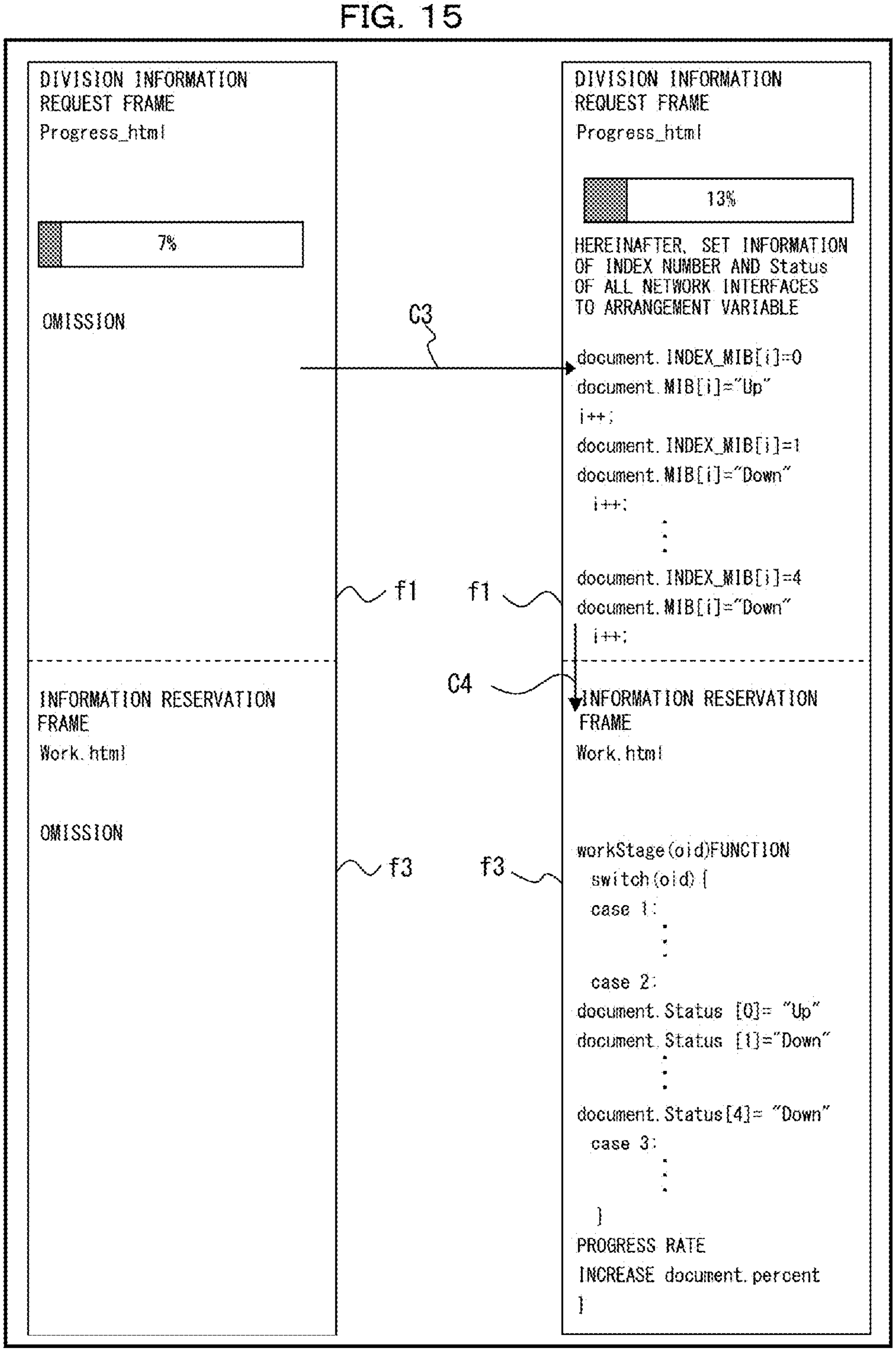
FIG. 15 is a diagram illustrating an example of a process of each frame of the web page data in the network system as an example of the first embodiment.
Figure 16:
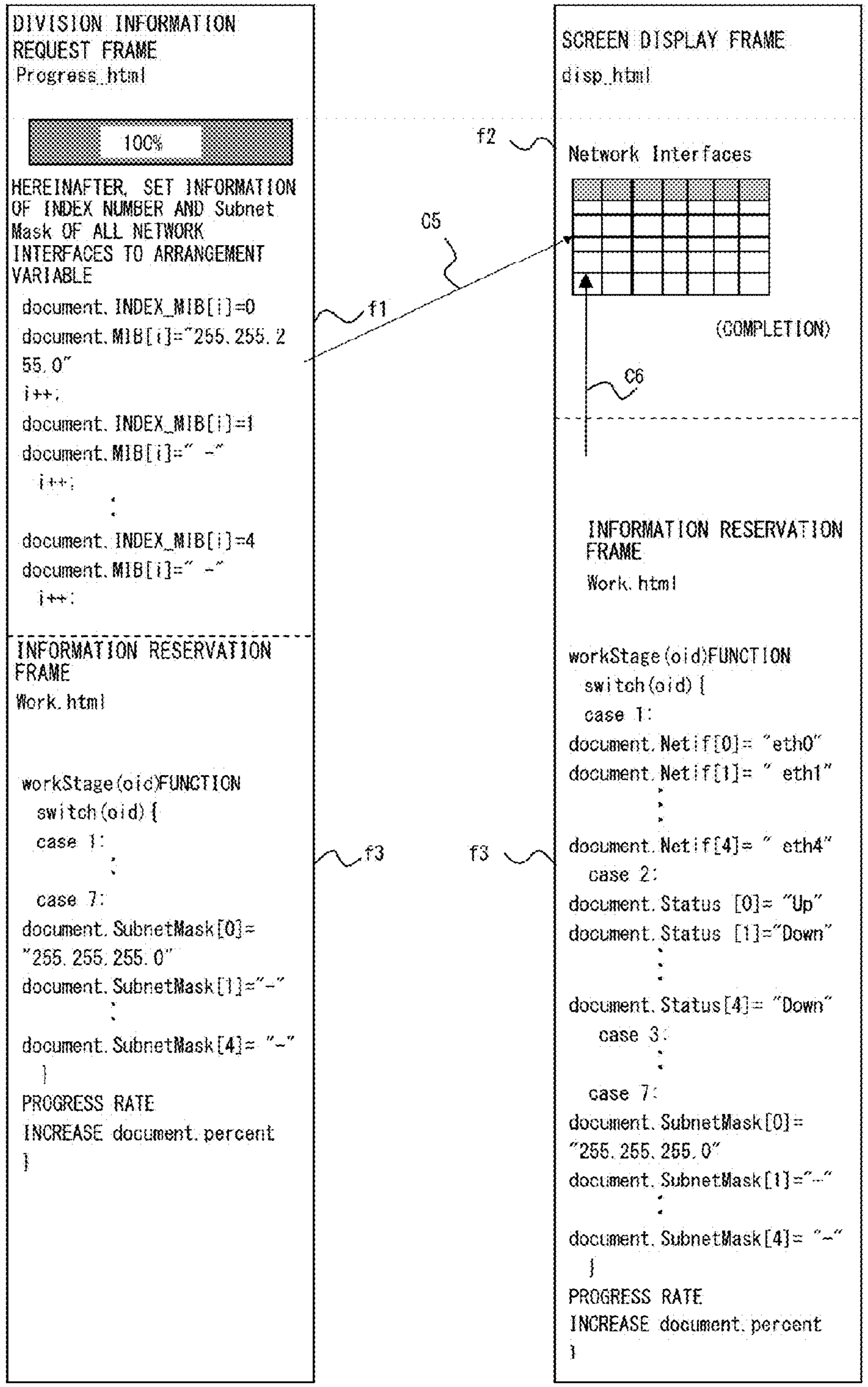
FIG. 16 is a diagram illustrating an example of a process of each frame of the web page data in the network system as an example of the first embodiment.
Figure 17:
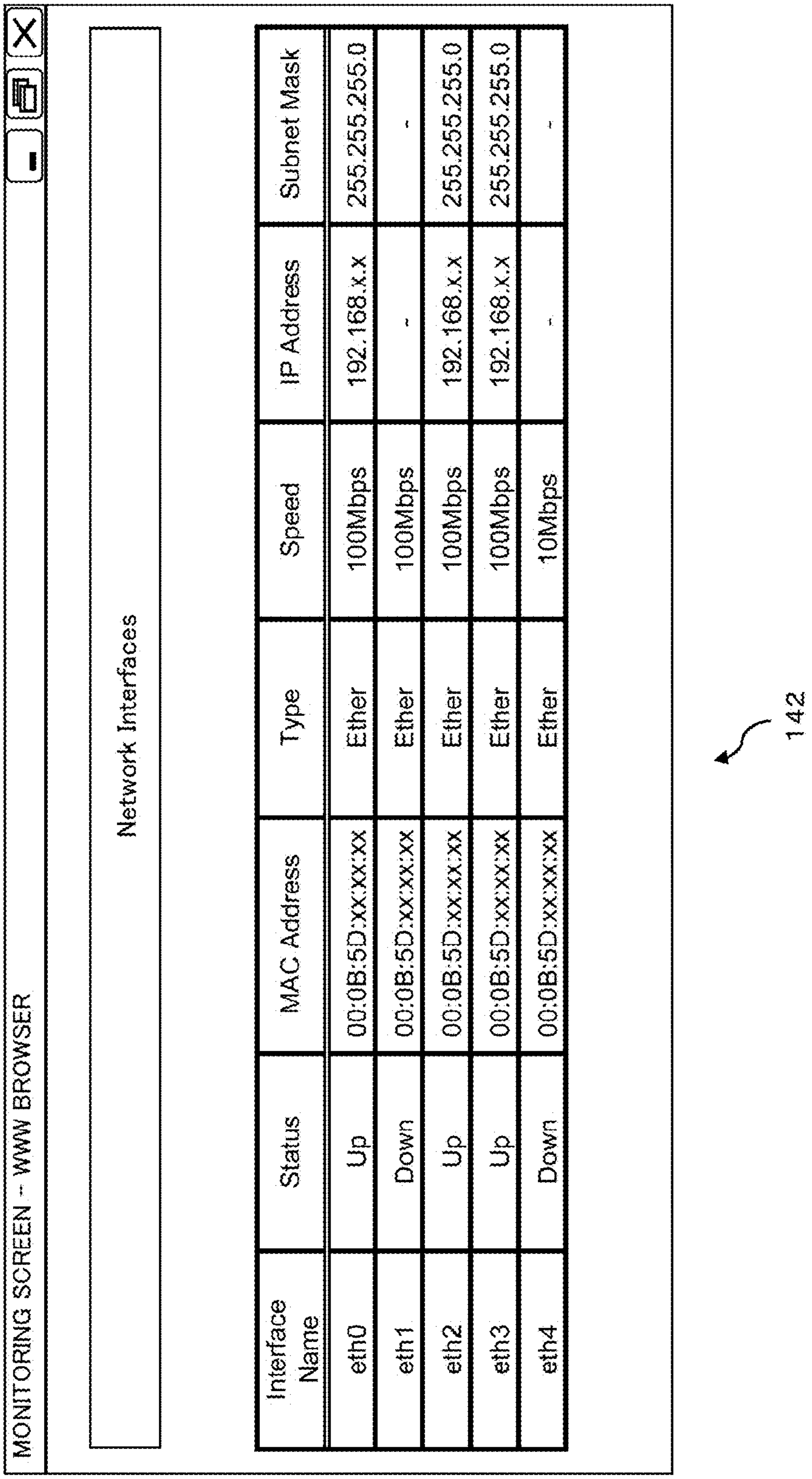
FIG. 17 is a diagram illustrating an example of output information output on a display in the network system as an example of the first embodiment.

Processes in the network system 1 as an example of the first embodiment configured as described above will be described according to a sequence diagram illustrated in FIG. 13 with reference to FIG. 14 to FIG. 17. Note that each of FIG. 14 to FIG. 16 is a diagram illustrating an example of a process of each frame of the web page data WD1 in the network system 1 as an example of the first embodiment. In addition, FIG. 17 is a diagram illustrating an example of the output information output to the display 14 in the network system 1 as an example of the first embodiment. Note that communication between the client terminal 10 and the monitoring target system 60 is performed through the CGI 51 of the web server 50.

(1) The monitoring information collection screen 141 (see FIG. 3) is displayed on the web browser 120 of the client terminal 10, and the user inputs the information collection target to the monitoring target input unit 1411 of the monitoring information collection screen 141 using a mouse or a keyboard. The user selects the collection start instruction input unit 1412 on the monitoring information collection screen 141. Accordingly, the information acquisition request (NetworkInterface screen call) for the information collection target is transmitted from the client terminal 10 to the monitoring target system 60 through the CGI 51 of the web server 50.

Figure 13:
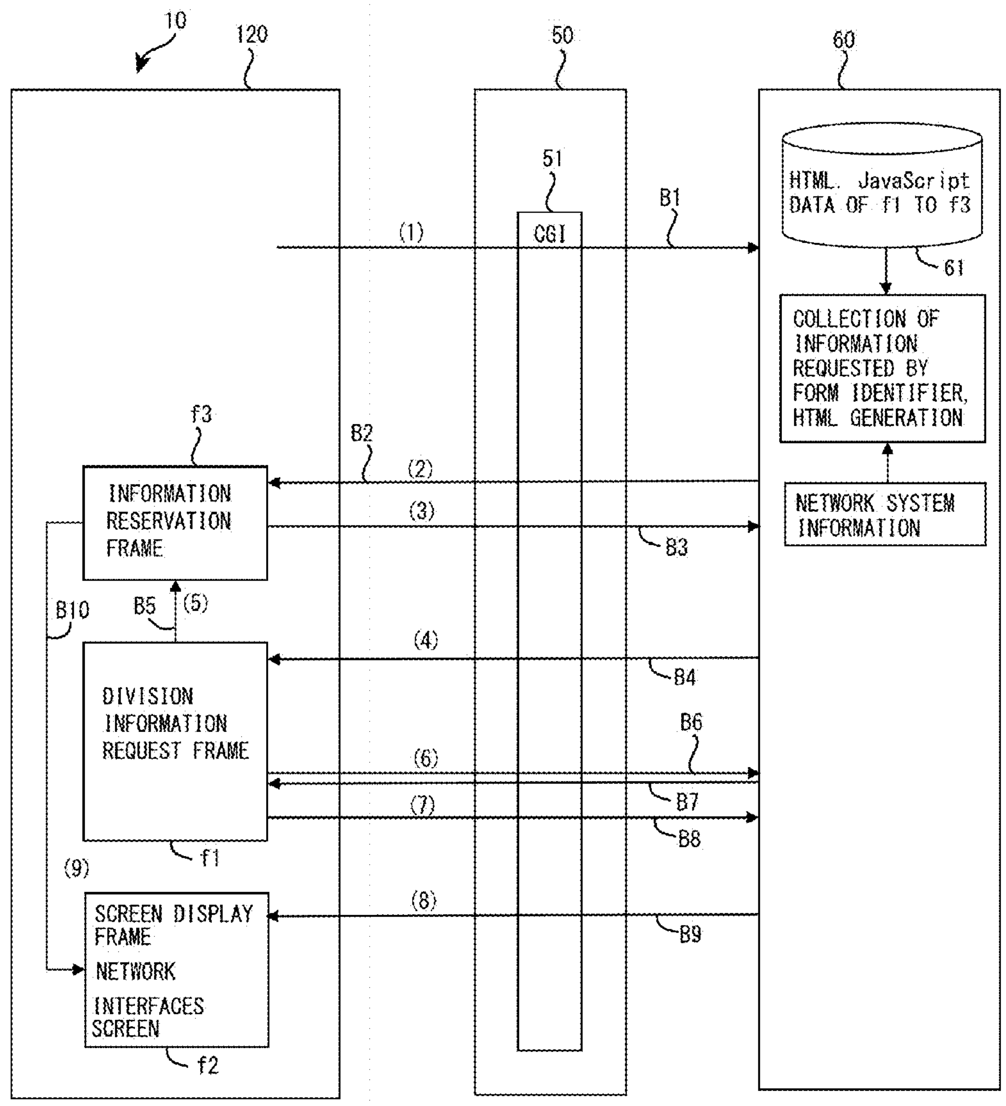
FIG. 13 is a sequence diagram illustrating a process in the network system as an example of the first embodiment.

For example, a call request of the screen (the network interface screen) of displaying the information about the network interface is made to from the web browser 120 of the client terminal 10 to the monitoring target system 60 (see the sign B1 of FIG. 13).

In the example illustrated in FIG. 14, progress.html?IFOID=1 is loaded to the division information request frame, for example, using the FORM information IFOID=1 as the identifier for acquiring the information of the interface name, from work.html of the information reservation frame f3 (see the sign C1 of FIG. 14).

Accordingly, in the management function processing unit 61, the HTML data of progress.html corresponding to the division acquisition request is generated. That is, the management function processing unit 61 acquires the information of the item (the interface name) based on the identifier of the IFOID, and generates the HTML data based on the INDEX number and the interface name.

(2) In the monitoring target system 60, the function processing unit 61 transmits the HTML data and JavaScript of work.html of the information reservation frame f3 of the web page data WD1 to the web browser 120 of the client terminal 10 through the CGI 51 of the web server 50 (see the sign B2 of FIG. 13).

(3) The work.html is performed in the web browser 120 of the client terminal 10 such that the information acquisition request (the division acquisition request) from progress.html with the FORM information is transmitted from the client terminal 10 to the monitoring target system 60 (see the sign B3 of FIG. 13).

Accordingly, the management function processing unit 61 acquires the information (the interface name) of the corresponding item based on the identifier (IFOID=1) of the FORM information, and generates the HTML data of progress.html. The HTML data of progress.html includes the interface name information and the INDEX numbers set in advance as serial numbers for all the network interfaces, as the division response information.

(4) The HTML data of progress.html generated by the management function processing unit 61 is transmitted to the web browser 120 of the client terminal 10 (see the sign B4 of FIG. 13), and is received as the division information request frame f1 (see a division information request frame f1 of FIG. 14). The HTML data of progress.html includes the division response information.

In addition, at the screen display time, the progress situation to which the value of document.percent (the progress rate) in work.html of the information reservation frame f3 is reflected is displayed as the progress bar.

(5) The information such as the interface name acquired by the division information request frame f1 is stored in the information reservation frame f3 (see the sign B5 of FIG. 13). Specifically, the workStage function in work.html is called from progress.html of the division information request frame f1, and the information of the interface name and the INDEX number set as the arrangement variable is reserved in the arrangement variable document.Netif in work.html of the information reservation frame f3 (see the sign C2 of FIG. 14). Note that, in this case, the value (1) of the FORM information is designated in the factor oid. In addition, the information of the INDEX number and the interface name corresponds to the division response information.

(6) After the reservation of the information such as the interface name into the information reservation frame f3 is completed, the information acquisition request (the division acquisition request) from progress.html with the FORM information is transmitted again from the client terminal 10 to the monitoring target system 60 (see the sign B6 of FIG. 13).

In this case, in the division information request frame f1, the FORM information IFOID is subjected to increment, and the FORM information IFOID is changed to the identifier of the next-acquired information. Reload of progress.html is performed in which the identifier subjected to the increment as described above is a factor. For example, the FORM information IFOID is subjected to increment, and reload of progress.html?IFOID=2 is performed in a state where the FORM information IFOID is IFOID=2 corresponding to the identifier of the next-acquired status.

Accordingly, in the management function processing unit 61, the HTML data of progress.html corresponding to the division acquisition request is generated similarly to the previous time. That is, the management function processing unit 61 acquires the information of the next item (for example, the status) based on the identifier of IFOID, and generates the HTML data based on the status information and the INDEX number (see the sign C3 of FIG. 15).

The HTML data of progress.html generated in the management function processing unit 61 is transmitted to the browser of the client terminal 10 (see the sign B7 of FIG. 13), and is received as the division information request frame f1 (see a division information request frame f1 of FIG. 15).

The information such as the status acquired by the division information request frame f1 is stored in the information reservation frame f3 (see the sign B5 of FIG. 13 and the sign C4 of FIG. 15).

Hereinafter, the processes according to the above (4) to (6) are repeated while performing increment of IFOID, until the information acquisition for all the items about the information collection target is performed (in the embodiment, until the FORM information IFOID=7).

For example, after the reservation of the information such as the status into the information reservation frame f3 is completed, the FORM information IFOID is changed (increment) to IFOID=3 corresponding to the identifier of the next-acquired MAC address, and reload of progress.html?IFOID=3 is performed. In addition, after the reload is completed, the information such as the status acquired by the division information request frame f1 is stored in the information reservation frame f3 (see the sign B5 of FIG. 13 and the sign C4 of FIG. 15).

Hereinafter, similarly, the increment of the FORM information IFOID, the reload of progress.html, and the storing of the acquired information into the information reservation frame f3 are repeated, and the reservation of the subnet mask information of IFOID=7 is even performed.

(7) When the reservation of the subnet mask information is completed as the FORM information IFOID=7 and the information acquisition for all the items of the information collection target is completed, a disp.html request (load) from the division information request frame f1 to the screen display frame f2 is made to the monitoring target system 60 (see the sign B8 of FIG. 13).

(8) The management function processing unit 61 generates the HTML data disp.html of displaying a frame of a table displayed on the display 14 of the screen display frame f2, and transmits the HTML data disp.html to the web browser 120 of the client terminal 10 (see the sign B9 of FIG. 13 and the sign C5 of FIG. 16). The table frame has the number of lines corresponding to the number (the number of INDEX numbers; in the embodiment, five) of all information collection targets (the network interfaces) provided in the monitoring target system 60, and has the number of columns corresponding to the number of items (in the embodiment, seven).

(9) When the web browser 120 displays the screen display frame disp.html, it is read from each arrangement variable in work.html of the information reservation frame f3 and is displayed on the screen, as the information corresponding to each network interface information in the table (see the sign B10 of FIG. 13 and the sign C6 of FIG. 16).

Accordingly, an output screen 142 displaying the information about the network interface illustrated in FIG. 17 is displayed on the display 14 of the client terminal 10 through the web browser 120. Note that the output screen 142 illustrated in FIG. 17 displays the information about the information collection target, as a table.

As described above, according to the network system 1 as an example of the first embodiment, the information acquisition request input to the client terminal 10 is acquired as the plurality of division information acquisition requests from the division information request frame f1. Accordingly, in the web server 50 mediating with the monitoring target system 60, it is possible to reduce the size of the HTML data processed at once by the CGI 51, and it is possible to relieve concentration of load in the web server 50. Particularly, even when the data size of the collection target information is large, the collection target information is divisionally acquired for each item, and thus it is not affected by the data size of the collection target information. Accordingly, in the web browser 120 of the client terminal 10, it is possible to reliably acquire and display the collection target information.

In addition, the information acquisition request is acquired as the plurality of division information acquisition requests, and thus it is possible to reduce the size of a piece of HTML data processed by the CGI 51 of the web server 50. Accordingly, a CGI time-out error does not easily occur in the CGI 51, and it is possible to reliably display more information on the client terminal 10.

In addition, in the division information request frame f1, the progress of the division information collection is displayed on the screen, and thus it is possible to show the progress situation of the process to the user of the client terminal 10. Accordingly, it is possible to improve satisfaction of the user.

In addition, the functions described above are realized by HTML and JavaScript of the web page data WD1, and thus can be realized as functions basically provided in the general web browser. Accordingly, in the client terminal 10, an additional application need not be installed in the web browser 120, a risk of security is not raised, and a user circumference of the user is not restricted. In addition, it is possible to economically reduce an introduction cost and an operational cost.

(B) Description of Second Embodiment

Figure 18:
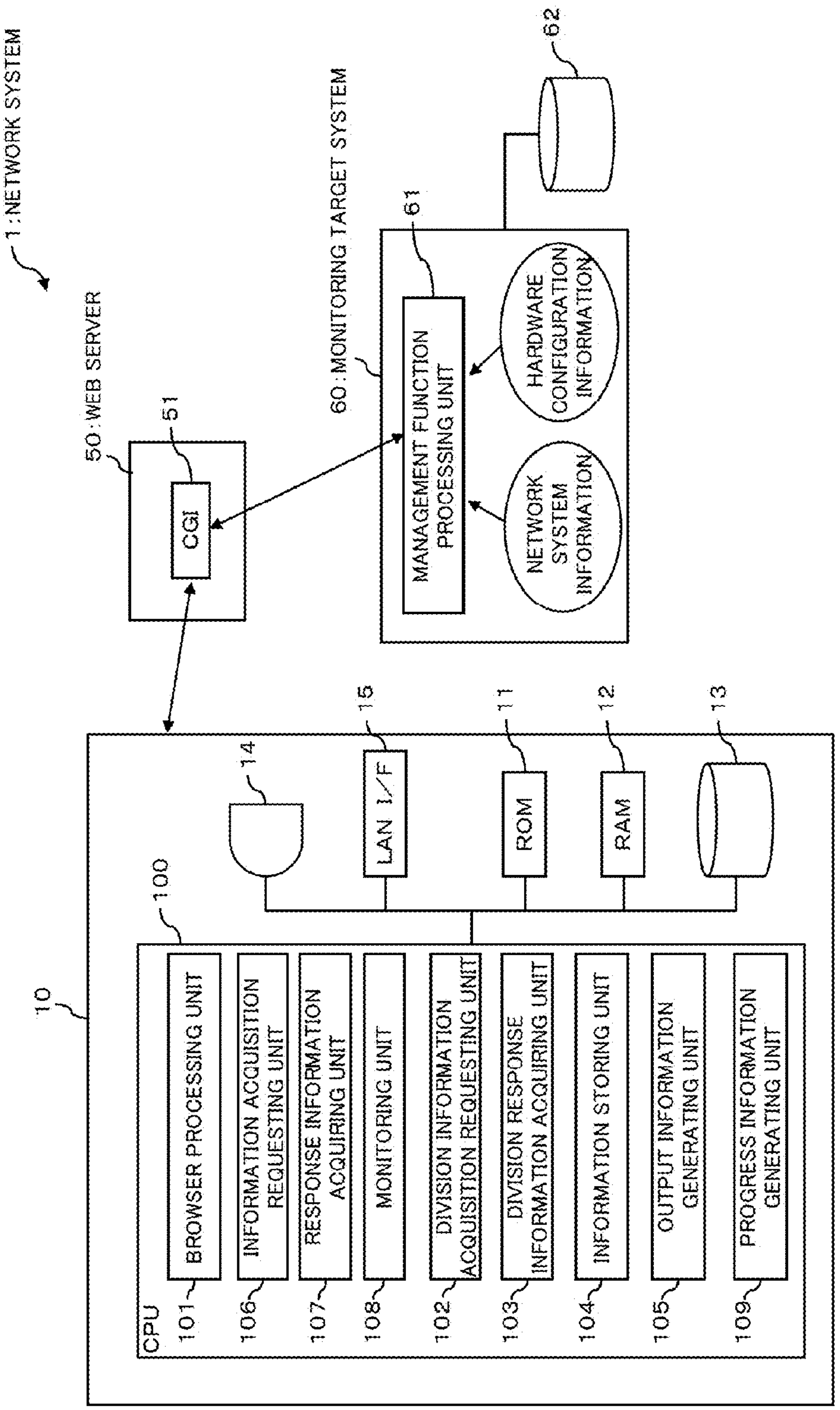
FIG. 18 is a diagram schematically illustrating a functional configuration of a network system as an example of a second embodiment.
Figure 19:
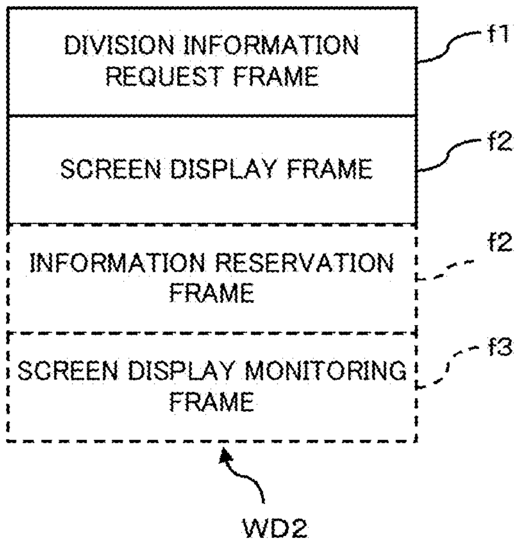
FIG. 19 is a diagram schematically illustrating an example of a configuration of web page data in the network system as an example of the second embodiment.

FIG. 18 is a diagram schematically illustrating a functional configuration of a network system 1 as an example of a second embodiment, and FIG. 19 is a diagram schematically illustrating an example of a configuration of web page data WD2 in the network system 1 as an example of the second embodiment.

In the network system 1 as an example of the second embodiment, a CPU 100 (a browser processing unit 101) processes the web page data WD2 using a web browser 120, to also realize the functions as an information acquisition requesting unit 106, a response information acquiring unit 107, and a monitoring unit 108 in addition to various functions as the client terminal 10 of the first embodiment. The others are configured with the same configuration as that of the network system 1 of the first embodiment.

Note that, in the figure, the same sign described above represents the same or substantially the same portion, and thus the description thereof is not repeated.

That is, in the client terminal 10, the browser processing unit 101 processes the web page data WD2 transmitted from the monitoring target system 60 through the web server 50, using the web browser 120, to realize the functions as the division information acquisition requesting unit 102, the division response information acquiring unit 103, the information storing unit 104, the output information generating unit 105, the information acquisition requesting unit 106, the response information acquiring unit 107, and the monitoring unit 108.

That is, in the client terminal 10, the CPU 100 (the browser processing unit 101) processes the web page data WD2 such that the CPU 100 serves as the division information acquisition requesting unit 102, the division response information acquiring unit 103, the information storing unit 104, the output information generating unit 105, the information acquisition requesting unit 106, the response information acquiring unit 107, the monitoring unit 108 and the progress information generating unit 109.

As illustrated in FIG. 19, the web page data WD2 includes a division information request frame f1, a screen display frame f2a, an information reservation frame f3, and a screen display monitoring frame f4.

The screen display frame f2a has HTML data old.html in addition to the function of the screen display frame f2 of the first embodiment. The old.html reads an output screen generated using the conventional method by the monitoring target system 60 with respect to the information collection target, and outputs the output screen to the display 14 or the like.

The output screen displays, for example, information about the information collection target illustrated in FIG. 17 as a table, and is generated by the management function processing unit 61 of the monitoring target system 60. Note that the output screen displaying the information of the network interface exemplified in FIG. 17 may be referred to as a network interface screen.

The display request of old.html made by the web browser 120 in the client terminal 10 is transmitted to the monitoring target system 60 through the CGI 51 of the web server 50.

When the display request of old.html is made from the web browser 120 (the screen display frame f2a) of the client terminal 10, the management function processing unit 61 collects information of all (in the example illustrated in FIG. 17, seven kinds) items preset for the information collection target (for example, the network interface). The management function processing unit 61 acquires the information of all the items for generating the output information, and then generates the HTML data constituting the output screen by the existing method using the collected information. For example, the management function processing unit 61 stores the collected information in each section of a table form prepared in advance, to generate the output information illustrated in FIG. 17.

That is, the information acquisition request in the non-division acquisition mode is made as one information acquisition request without dividing the information acquisition request about the information collection target in the monitoring target system 60 into a plurality of division information acquisition requests.

FIG. 20 is a diagram illustrating an example of a method of realizing the information acquisition request in the non-division acquisition mode in the network system 1 as an example of the second embodiment, and FIG. 21 is a diagram illustrating a method of acquiring information of the information collection target.

As described above, in the web browser 120 of the client terminal 10, old.html is loaded by the location.href property, the information of all the items about the information acquisition target is acquired through the web server 50 by one information acquisition request.

For example, the network interface screen (old.html) is called to the screen display frame f2a using the script illustrated in FIG. 20.

That is, when the information acquisition target is the network interface, old.html is loaded by the location.href property, and thus acquisition of information including Interface Name, Status, MAC Address, Type, Speed, IP Address, and Subnet Mask collected in the monitoring target system 60 is started by one information acquisition request.

Hereinafter, the display request of old.html is made from the web browser 120 of the client terminal 10, and the making of the output request of the output information about the information collection target may be referred to as an information acquisition request in the non-division acquisition mode.

In addition, as for the output request in the non-division acquisition mode, in the first embodiment described above, the transmitting of the plurality of division information acquisition requests obtained by dividing the information acquisition request to the monitoring target system 60 by the division information request frame f1 through the web server 50 may be referred to as the information acquisition request in the division acquisition mode.

In the network system 1 of the second embodiment, any of the information acquisition request in the non-division acquisition mode and the information acquisition request in the division acquisition mode may be made from the client terminal 10.

In addition, in the network system 1 of the second embodiment, in the division acquisition mode, a function of acquiring (the division acquisition request) the collection target information by a unit of cells represented by lines and columns in a table in which a plurality of network interfaces are lines and a plurality of items are columns is provided as illustrated by surrounding circles of broken lines of FIG. 21.

Hereinafter, in the second embodiment, a method of acquiring the collection target information by a unit of cells as described above is referred to as cell unit division acquisition or subdivision acquisition. In addition, meanwhile, a method of acquiring the collection target information by a unit of cells in the plurality of network interfaces described in the first embodiment is hereinafter referred to as item unit division acquisition. In the cell unit division acquisition, a unit of division of the collection target information is smaller than that of the item unit division acquisition.

That is, in the network system 1 of the second embodiment, the collection target information may be acquired by both methods of the cell unit division acquisition and the item unit division acquisition described in the first embodiment.

FIG. 22 is a diagram illustrating an example of a script for realizing the cell unit division acquisition in the network system 1 as an example of the second embodiment. The script illustrated in FIG. 22 is to make a progress.html request of the division information request frame f1, and may be provided, for example, in Time.html of the screen display monitoring frame f4.

In the script illustrated in FIG. 22, as an identifier for specifying a cell for performing information acquisition (division information acquisition), two-dimensional coordinate parameters (FORM information IFOID=X, Y) of X and Y are used (see the sign A14 of FIG. 22).

That is, the load of progress.html based on the location.href property is repeated while sequentially changing the cells for performing the information acquisition, to acquire the collection target information by a unit of cells. The information acquisition request from progress.html of acquiring the collection target information by a unit of cells is referred to as a subdivision information acquisition request.

In the screen display monitoring frame f4, a response for the display request of old.html based on the screen display frame f2a is monitored (timer monitoring). Specifically, in the screen display monitoring frame f4, an internal timer is provided, and an elapsed time from the making of the display request of old.html is measured. When the elapsed time is over a preset timer time (a first reference time), occurrence of a time-out error (a response delay, a first response delay) is detected.

In the screen display monitoring frame f4, when the time-out error occurs and the screen of old.html is displayed within the timer time, the Progress.html is called to the division information request frame f1 described above. In addition, simultaneously, in the screen display monitoring frame f4, Time.html is recalled to the screen display frame f2a, and the internal timer of the screen display frame f2a is reset.

Note that in order to synchronize a process start of the old.html display request with a timer monitoring start based on the screen display monitoring frame f4, the calling of old.html based on the screen display frame f2a and the calling of Time.html of the screen display frame f2 described above are simultaneously performed.

In addition, in the screen display frame f2, the timer monitoring is performed even on the response for the display request of Progress.html of the division information request frame f1. Specifically, in the screen display monitoring frame f4, an elapsed time after performing the display request of Progress.html is measured by the internal timer at the time of the item unit division acquisition. When the elapsed time is over a preset timer time (a second reference time), occurrence of a time-out error (a response delay, a second response delay) is detected.

In the screen display monitoring frame f4, when the time-out error occurs and the screen of Progress.html is not displayed within the timer time, Progress.html (see FIG. 22) for re-division is called to the division information request frame f1 described above.

That is, in the screen display monitoring frame f4, when the screen is not displayed within the timer time, the unit of division is further minutely divided and the division information request of the next collection target information is made. That is, switching from the item unit division acquisition to the cell unit division acquisition is performed.

Note that it is preferable that the screen display monitoring frame f4 is handled as an area (non-display) which is not displayed on the display 14 by making the frame size into 0.

In the client terminal 10, the browser processing unit 101 processes the screen display frame f2a such that the CPU 100 serves as the monitoring unit 108. In addition, the browser processing unit 101 processes the division information request frame f1 such that the CPU 100 serves as the information acquisition requesting unit 106 and the response information acquiring unit 107.

The processes in the network system 1 as an example of the second embodiment configured as described above will be described according to a sequence diagram illustrated in FIG. 23 with reference to FIG. 24. Note that FIG. 24 is a diagram illustrating an example of transition of the processes of the esch frame of the web page data WD2 in the network system 1 as an example of the second embodiment.

Figure 23:
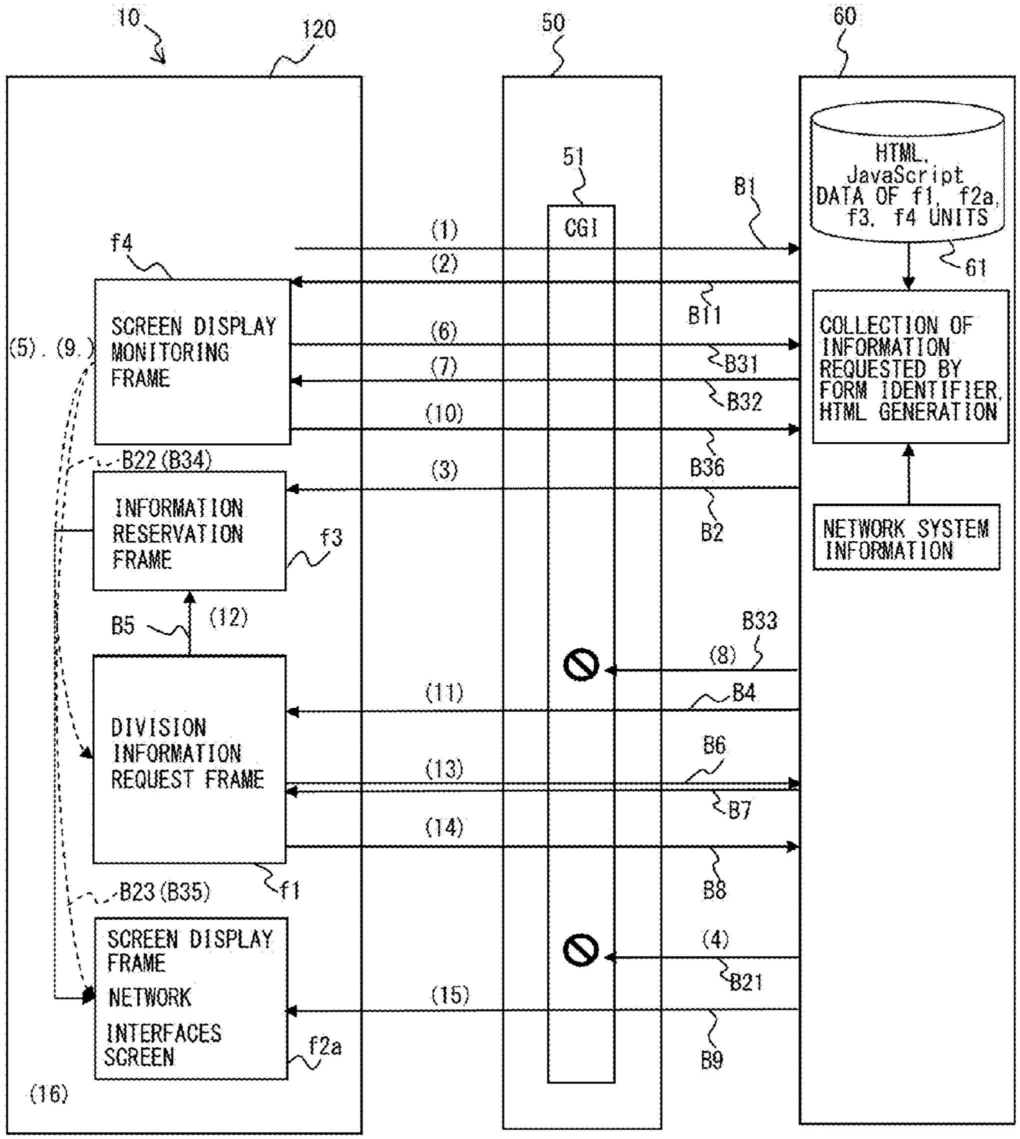
FIG. 23 is a sequence diagram illustrating a process in the network system as an example of the second embodiment.
Figure 24:
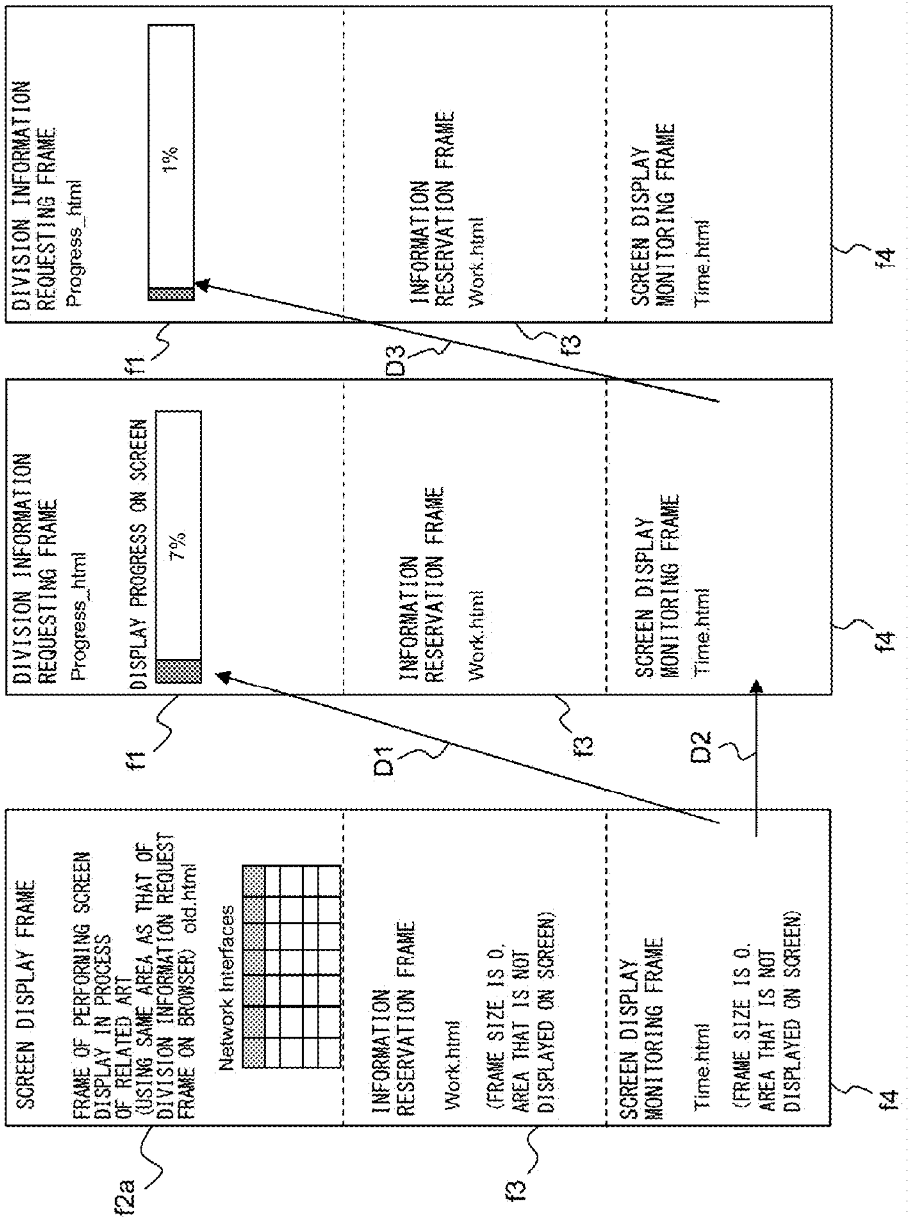
FIG. 24 is a diagram illustrating an example of transition of processes of frames of the web page data in the network system as an example of the second embodiment.

Note that in FIG. 23, the process to which the same sign as the sign described above is attached represents the same or substantially the same process, and thus the detailed description thereof is not made. In addition, communication between the client terminal 10 and the monitoring target system 60 is performed through the CGI 51 of the web server 50.

(1) The monitoring information collection screen 141 (see FIG. 3) is displayed on the web browser 120 of the client terminal 10, and the user inputs the information collection target to the monitoring target input unit 1411 of the monitoring information collection screen 141 using a mouse or a keyboard. The user selects the collection start instruction input unit 1412 on the monitoring information collection screen 141. Accordingly, the information acquisition request (NetworkInterface screen call) for the information collection target is transmitted from the client terminal 10 to the monitoring target system 60 through the CGI 51 of the web server 50.

For example, a call request of the screen (the network interface screen) of displaying the information about the network interface is made from the web browser 120 of the client terminal 10 to the monitoring target system 60 (see the sign B1 of FIG. 23).

(2) In the monitoring target system 60, the function processing unit 61 transmits the HTML data and JavaScript of time.html of the screen display frame f2a of the web page data WD2 to the web browser 120 of the client terminal 10 through the CGI 51 of the web server 50. (see the sign B11 of FIG. 13).

(3) The HTML data and JavaScript of work.html of the information reservation frame f3 of the web page data WD2 are transmitted to the web browser 120 of the client terminal 10 through the CGI 51 of the web server 50 (see the sign B2 of FIG. 23).

(4) The management function processing unit 61 transmits old.html of the screen display frame f2a to the web browser 120 (the screen display frame f2a) of the client terminal 10 through the web server 50. Herein, it is assumed that a CGI time-out error occurs in the web server 50 and transmission of old.html from the web server 50 to the client terminal 10 fails (see the sign B21 of FIG. 23).

(5) In the screen display monitoring frame f4, timer monitoring of the display of old.html by the screen display frame f2a is performed, the occurrence of the time-out error is detected (first time-out error detection) when the elapsed time from the making of the display request of old.html is over the timer time (the first reference time) (see the sign B23 of FIG. 23). Accordingly, in the screen display monitoring frame f4, it is determined that the item unit division acquisition is performed (see the sign B22 of FIG. 23).

(6) In the screen display monitoring frame f4, the request of Progress.html (the item unit division acquisition request) is made to the monitoring target system 60 to call Progress.html in which the collection target information is acquired by a unit of items to the division information request frame f1 (see the sign D1 of FIG. 24). The request of progress.html includes a FORM identifier. In addition, simultaneously, a re-reading request of Time.html is made in the screen display monitoring frame f4 (see the sign D2 of FIG. 24 and the sign B31 of FIG. 23).

(7) According to the re-reading request, the management function processing unit 61 transmits Time.html to the web browser 120 of the client terminal 10, and the monitoring timer is reset (see the sign B32 of FIG. 23).

(8) The management function processing unit 61 transmits progress.html of the division information request frame f1 to the web browser 120 of the client terminal 10. Herein, it is assumed that a CGI time-out error occurs in the web server 50 and transmission of progress.html from the web server 50 to the client terminal 10 fails (see the sign B33 of FIG. 23).

(9) In the screen display monitoring frame f4, timer monitoring of the display of progress.html by the screen display frame f2a is performed, the occurrence of the time-out error is detected (second time-out error detection) when the elapsed time from the making of the display request of progress.html is over the timer time (the second reference time) (see the sign B35 of FIG. 23). Accordingly, in the screen display monitoring frame f4, it is determined that the cell unit division acquisition is performed (see the sign B34 of FIG. 23).

(10) In the screen display monitoring frame f4, the request of Progress.html (the subdivision information acquisition request) is made to the monitoring target system 60 to call Progress.html in which the collection target information is acquired by a unit of cells to the division information request frame f1 (see the sign D1 of FIG. 24). The request of progress.html includes a FORM identifier. In addition, simultaneously, a re-reading request of Time.html is made in the screen display monitoring frame f4 (see the sign D3 of FIG. 24 and the sign B36 of FIG. 23).

Accordingly, the management function processing unit 61 acquires information of the corresponding cell based on the identifier (IFOID=X, Y) of the FORM information, and generates the HTML data of progress.html.

(11) The HTML data of progress.html generated by the management function processing unit 61 is transmitted to the web browser 120 of the client terminal 10 (see the sign B4 of FIG. 23), and is received as the division information request frame f1. The HTML data of progress.html includes division response information.

(12) The information of the cell acquired by the division information request frame f1 is stored in the information reservation frame f3 (see the sign B5 of FIG. 13). Specifically, the workStage function in work.html is called from progress.html of the division information request frame f1 such that the information of the INDEX number and the interface name set in the arrangement variable is reserved in the arrangement variable document.Netif in work.html of the information reservation frame f3.

(13) The reservation of the information such as the interface name into the information reservation frame f3 is completed, and then the information acquisition request (the division acquisition request) from progress.html with the FORM information is transmitted again from the client terminal 10 to the monitoring target system 60 (see the sign B6 of FIG. 23).

In this case, in the division information request frame f1, X and Y of the FORM information IFOID are appropriately subjected to increment, and the FORM information IFOID is changed to the identifier of the next-acquired information. In this way, reload of progress.html is performed in which the identifier subjected to the increment is a factor.

Accordingly, in the management function processing unit 61, similarly to the previous time, the HTML data of progress.html corresponding to the division acquisition request is generated. That is, the management function processing unit 61 acquires the next cell information and generates the HTML data based on the identifier of IFOID.

The HTML data of progress.html generated by the management function processing unit 61 is transmitted to the browser of the client terminal 10 (see the sign B7 of FIG. 13), and is received as the division information request frame f1.

The information such as the status acquired by the division information request frame f1 is stored in the information reservation frame f3 (see the sign B5 of FIG. 23).

Hereinafter, the processes according to the above (11) to (13) are repeated while appropriately performing the increment of X and Y of IFOID until the information is acquired for all the cells about the information collection target. In addition, after the reload is completed, the cell information acquired by the division information request frame f1 is stored in the information reservation frame f3 (see the sign B5 of FIG. 23).

Hereinafter, similarly, the increment of the FORM information IFOID, the reload of progress.html, and the storing of the acquired information into the information reservation frame f3 are repeated, and the information about all the cells constituting the collection target information is acquired and reserved.

(14) When the collecting of the information of all the cells is completed, the disp.html request (load) from the division information request frame f1 to the screen display frame f2a is made in the monitoring target system 60 (see the sign B8 of FIG. 23).

(15) The management function processing unit 61 generates the HTML data disp.html representing a frame of the table displayed on the display 14 of the screen display frame f2a (see the sign B9 of FIG. 23). The table frame is provided with the number of lines corresponding to the number (the number of INDEX numbers; in the embodiment, five) of all the information collection targets (the network interfaces) provided in the monitoring target system 60, and is provided with the number of columns corresponding to the number (in the embodiment, seven) of items.

(16) When the web browser 120 displays the screen display frame disp.html, it is read from the arrangement variables in work.html of the information reservation frame f3 as the information corresponding to each network interface information in the table and is displayed on the screen (see the sign B10 of FIG. 23).

Accordingly, the output screen 142 representing the information about the network interface illustrated in FIG. 17 is displayed on the display 14 of the client terminal 10 through the web browser 120.

As described above, according to the network system 1 as an example of the second embodiment, it is possible to obtain the same operational effect as that of the first embodiment. In addition, when the time-out error in the non-division acquisition mode is detected in the screen display monitoring frame f4, it is switched to the division acquisition mode (the item unit division acquisition) and the collection target information is acquired. Accordingly, it is possible to reduce the load of the CGI 51, and it is possible to reliably acquire the collection target information in the web browser 120 of the client terminal 10. In addition, in this case, in the client terminal 10, a process such as re-acquisition need not be performed in order for the user to acquire the information, and thus convenience is high.

In addition, at the time of acquiring the collection target information based on the item unit division acquisition, when the time-out error is detected in the screen display monitoring frame f4, it is switched to the cell unit division acquisition, and the collection target information is acquired. Accordingly, it is possible to further reduce the load of the CGI 51, and it is possible to reliably acquire the collection target information in the web browser 120 of the client terminal 10. In addition, even in this case, in the client terminal 10, a process such as re-acquisition need not be performed in order for the user to acquire the information, and thus convenience is high.

When the data size of the collection target information is small and the time-out error does not occur even in the information acquisition based on the non-division acquisition mode, the information acquisition based on the division acquisition mode is not performed. Accordingly, it is possible to acquire the collection target information by one process in the CGI 51, and it is possible to efficiently complete the process.

That is, even under a situation in which the system such as the web server 50 is in high load, the information acquiring process (the item unit division acquisition, the cell unit division acquisition) according to the load situation is performed, and thus it is possible to further reliably display the information on the screen.

(C) Others

In the embodiments described above, the CPU provided in the monitoring target system 60 executes a program to serve as the management function processing unit 61 described above.

Note that the program for realizing the function as the management function processing unit 61 is provided, for example, in a form of recording in a computer readable recording medium such as a flexible disk, a CD (CD-ROM, CD-R, CD-RW, or the like), a DVD (DVD-ROM, DVD-RAM, DVD-R, DVD+R, DVD-RW, DVD+RW, or the like), a magnetic disk, an optical disk, and a magneto-optical disk. The computer reads the program from the recording medium, and the program is transmitted to and stored in an internal storage device or an external storage device, and is used. In addition, for example, the program may be recorded in the storage device (the recording medium) such as a magnetic disk, an optical disk, and a magneto-optical disk, and may be provided to the computer from the storage device through a communication path.

To realize the function as the management function processing unit 61, the program stored in the internal storage device (in the embodiment, the RAM or the ROM of the monitoring target system 60) is executed by a microprocessor (in the embodiment, the CPU) of the computer. In this case, the program recorded in the recording medium may be read and executed by the computer.

Note that, in the embodiment, the computer means a concept including a hardware and an operating system, and means a hardware operating under the control of the operating system. In addition, when the operating system is not needed and the hardware is operated by an application program alone, the hardware itself corresponds to the computer. The hardware includes at least a microprocessor such as a CPU, and a unit for reading the computer program recorded in the recording medium, and the monitoring target system 60 has a function as the computer in the embodiment.

The invention is not limited to the embodiments described above, and may be variously modified within the scope which does not deviate from the purpose of the invention.

For example, in the embodiments described above, in the division information request frame f1, the collection target information is divided for each item and the acquisition request is made in the item unit division acquisition, but the invention is not limited thereto, and may be variously modified. For example, the acquisition request in which two or more items of the collection target information is one division acquisition request unit may be made, and the acquisition (the division acquisition request) may be performed for each index (for each network interface) constituting the collection target information.

In the second embodiment described above, the item unit division acquisition is performed when the first time-out error detection is performed, and then the cell unit division acquisition is performed when the second time-out error detection is performed, but the invention is not limited thereto.

For example, an error may be output to the display 14 instead of performing the cell unit division acquisition when the second time-out error detection is performed, and the cell unit division acquisition may be performed without performing the item unit division acquisition when the first time-out error detection is performed, which may be variously modified.

Note that the embodiments may be variously modified within the scope which does not deviate from the purpose of the invention regardless of the embodiments described above.

Note that, when the embodiments of the invention are disclosed, the information processing apparatus, the information acquiring method, and the information acquisition program of the invention may be embodied and produced by persons skilled in the art.

In the disclosed technique, it is possible to relieve concentration of load in the web server, and to reliably display information in the web browser.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus which is connected to a web server through a communication line and makes an information acquisition request with respect to an information generating device through the web server to acquire information from the information generating device, the information processing apparatus comprising:

a processor; and a memory coupled to the processor, the memory having an instruction stored thereon which, when executed by the processor, cause the information processing apparatus to perform operation comprising:

transmitting a plurality of division information acquisition requests obtained by dividing the information acquisition request to the information generating device through the web server;

acquiring division response information corresponding to the division information acquisition requests from the information generating device through the web server;

storing the acquired division response information;

generating output information using the stored division response information;

transmitting the information acquisition request in a non-division state to the information generating device through the web server;

acquiring response information corresponding to the information acquisition request from the information generating device through the web server;

measuring a response time of the response information from the web server with respect to the information acquisition request, and detecting occurrence of a first response delay when the response time is longer than a first reference time; and transmitting the division information acquisition requests to the information generating device when the first response delay is detected.

2. The information processing apparatus according to claim 1, wherein the operation further comprises measuring a response time of the division response information from the web server with respect to the division information acquisition requests, and detects occurrence of a second response delay when the response time is longer than a second reference time, wherein when the second response delay is detected, the operation transmits subdivision information acquisition requests divided by a unit of division smaller than that of the division information acquisition requests to the information generating device.

3. The information processing apparatus according to claim 1, wherein the operation further comprises generating progress information representing a progress situation of information acquisition with respect to the information acquisition requests based on an acquisition situation of the division response information.

4. An information acquiring method in which an information processing apparatus connected to a web server through a communication line makes an information acquisition request with respect to an information generating device through the web server to acquire information from the information generating device, the information acquiring method comprising:

transmitting the information acquisition request in a non-division state to the information generating device through the web server;

detecting occurrence of a first response delay when not obtaining response information from the web server with respect to the information acquisition request within a first reference time;

transmitting a plurality of division information acquisition requests obtained by dividing the information acquisition request to the information generating device through the web server when the first response delay is detected;

acquiring division response information corresponding to the division information acquisition requests from the information generating device through the web server;

storing the acquired division response information; and generating output information using the stored division response information.

5. The information acquiring method according to claim 4, further comprising detecting occurrence of a second response delay when not acquiring the division response information from the web server with respect to the division information acquisition requests within a second reference time, wherein when the second response delay is detected, subdivision information acquisition requests divided by a unit of division smaller than that of the division information acquisition requests are transmitted to the information generating device.

6. The information acquiring method according to claim 4, further comprising generating progress information representing a progress situation of information acquisition with respect to the information acquisition request based on an acquisition situation of the division response information.

7. A non-transitory computer readable recording medium in which an information acquisition program for causing a computer connected to a web server through a communication line to execute making an information acquisition request with respect to an information generating device through the web server to acquire information from the information generating device is recorded, wherein the information acquisition program causes the computer to execute:

transmitting a plurality of division information acquisition requests obtained by dividing the information acquisition request to the information generating device through the web server;

acquiring division response information corresponding to the division information acquisition requests from the information generating device through the web server;

storing the acquired division response information;

generating output information using the stored division response information;

transmitting the information acquisition request in a non-division state to the information generating device through the web server;

acquiring response information corresponding to the information acquisition request from the information generating device through the web server;

measuring a response time of the response information from the web server with respect to the information acquisition request, and detecting occurrence of a first response delay when the response time is longer than a first reference time; and transmitting the division information acquisition requests to the information generating device when the first response delay is detected.

8. The non-transitory computer readable recording medium in which the information acquisition program is recorded according to claim 7, the program causing the computer to further execute measuring a response time of the division response information from the web server with respect to the division information acquisition requests, and detecting occurrence of a second response delay when the response time is longer than a second reference time, wherein when the second response delay is detected, subdivision information acquisition requests divided by a unit of division smaller than that of the division information acquisition requests are transmitted to the information generating device.

9. The non-transitory computer readable recording medium in which the information acquisition program is recorded according to claim 7, the program causing the computer to further execute generating progress information representing a progress situation of information acquisition with respect to the information acquisition requests based on an acquisition situation of the division response information.

* * * * *